US011260559B2

(12) United States Patent
Wurtz et al.

(10) Patent No.: US 11,260,559 B2
(45) Date of Patent: Mar. 1, 2022

(54) AUTOMATIC WASHOUT SYSTEM FOR A MIXER VEHICLE

(71) Applicant: Oshkosh Corporation, Oshkosh, WI (US)

(72) Inventors: Chris L. Wurtz, Oshkosh, WI (US); Cody D. Clifton, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 851 days.

(21) Appl. No.: 15/875,659

(22) Filed: Jan. 19, 2018

(65) Prior Publication Data

US 2018/0250847 A1 Sep. 6, 2018

Related U.S. Application Data

(60) Provisional application No. 62/466,960, filed on Mar. 3, 2017.

(51) Int. Cl.
| | |
|---|---|
| *B28C 5/42* | (2006.01) |
| *B60P 3/16* | (2006.01) |
| *B60S 1/66* | (2006.01) |
| *B08B 9/08* | (2006.01) |
| *B05B 13/02* | (2006.01) |
| *B05B 15/60* | (2018.01) |

(52) U.S. Cl.
CPC .......... *B28C 5/422* (2013.01); *B05B 13/0278* (2013.01); *B08B 9/0813* (2013.01); *B28C 5/4203* (2013.01); *B28C 5/4237* (2013.01); *B28C 5/4248* (2013.01); *B28C 5/4272* (2013.01); *B60P 3/16* (2013.01); *B60S 1/66* (2013.01); *B05B 15/60* (2018.02); *B08B 2209/08* (2013.01)

(58) Field of Classification Search
CPC ..... G05D 11/132; B28C 5/4231; B28C 5/422; B01F 15/00025; B08B 9/0813; B08B 9/093; G01N 33/383
See application file for complete search history.

(56) References Cited

U.S. PATENT DOCUMENTS 9,802,578 B2 * 10/2017 Beck, III ................. B60S 1/64
2017/0361491 A1 12/2017 Datema et al.

FOREIGN PATENT DOCUMENTS

WO WO-2017/218935 12/2017

* cited by examiner

*Primary Examiner* — Elizabeth Insler
(74) *Attorney, Agent, or Firm* — Foley & Lardner LLP

(57) ABSTRACT

A washout system for a concrete mixer vehicle includes a plurality of valves, a plurality of nozzles, and a controller. The plurality of valves are configured to (i) be fluidly coupled to a pump and a fluid tank and (ii) receive a fluid from the pump. One or more of the plurality of nozzles are fluidly coupled to a respective one of the plurality of valves. Each of the plurality of nozzles are configured to provide the fluid to a respective target when the respective one of the plurality of valves is selectively activated to an open position. The controller is configured to monitor a plurality of washout parameters during operation of the concrete mixer vehicle and initiate one of a plurality of washout modes in response to a subset of the plurality of washout parameters being satisfied for the one of the plurality of washout modes.

19 Claims, 16 Drawing Sheets

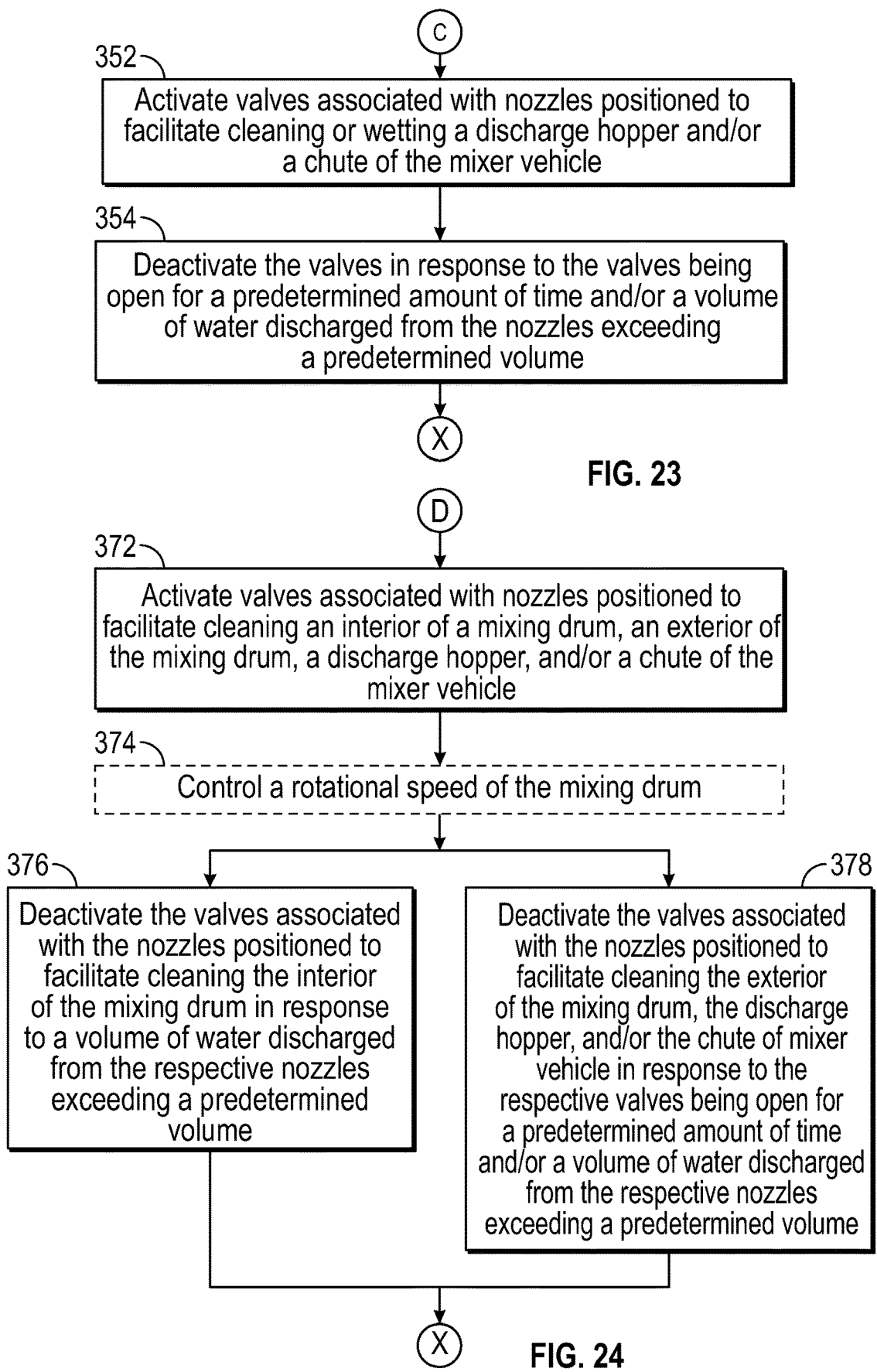

AUTOMATIC WASHOUT SYSTEM FOR A MIXER VEHICLE

CROSS-REFERENCE TO RELATED PATENT APPLICATIONS

This application claims the benefit of U.S. Provisional Patent Application No. 62/466,960, filed Mar. 3, 2017, which is incorporated herein by reference in its entirety.

BACKGROUND

Concrete mixing vehicles are configured to transport wet concrete to a job site. To prevent the concrete from setting, concrete mixing vehicles include a rotatable mixing drum that continually mixes the concrete disposed therein. The drum and other components of the concrete vehicle may need to be cleaned periodically.

SUMMARY

One embodiment relates to a concrete mixer vehicle. The concrete mixer vehicle includes a charge hopper, a mixing drum, a discharge hopper, a chute, a tank, and an automatic washout system having a plurality of electronically controllable valves, a plurality of nozzles, and a controller. The charge hopper is configured to receive a mixture or mixture ingredients. The mixing drum is positioned to receive the mixture or the mixture ingredients from the charge hopper. The discharge hopper is positioned to selectively receive a wet mixture from the mixing drum. The chute is positioned to receive the wet mixture from the discharge hopper. The tank is configured to store a fluid. The plurality of electronically controllable valves are in fluid communication with the tank. The plurality of electronically controllable valves are operable between an open position and a closed position. One or more of the plurality of nozzles are fluidly coupled to a respective one of the plurality of electronically controllable valves. Each of the plurality of nozzles are positioned to provide the fluid to a respective target when the respective one of the plurality of electronically controllable valves is selectively activated to the open position. The controller is configured to monitor a plurality of washout parameters during operation of the concrete mixer vehicle and initiate one of a plurality of washout modes in response to a subset of the plurality of washout parameters being satisfied for the one of the plurality of washout modes. Initiating the one of the plurality of washout modes includes selectively activating one or more of the plurality of electronically controllable valves according to the one of the plurality of washout modes such that each of the plurality of nozzles that correspond with the one or more of the plurality of electronically controllable valves selectively clean targets associated with the one of the plurality of washout modes. The targets include at least a portion of at least one of the charge hopper, an interior of the mixing drum, an exterior of the mixing drum, the discharge hopper, and the chute. Initiating at least one of the plurality of washout modes includes activating one or more of the plurality of electronically controllable valves such that the nozzles associated with the one or more of the plurality of electronically controllable valves provide the fluid to at least two of the charge hopper, the interior of the mixing drum, the exterior of the mixing drum, the discharge hopper, and the chute, simultaneously.

Another embodiment relates to a method for controlling a washout system according to various washout modes. The method includes monitoring, by a processing circuit, a plurality of washout parameters during operation of a concrete mixer vehicle; and initiating, by the processing circuit, one of a plurality of washout modes in response to a subset of the plurality of washout parameters being satisfied for the one of the plurality of washout modes. Initiating at least one of the plurality of washout modes includes activating, by the processing circuit, one or more of a plurality of valves such that nozzles associated with the one or more of the plurality of valves provide fluid to at least two of a charge hopper, an interior of a mixing drum, an exterior of the mixing drum, a discharge hopper, and a chute of the concrete mixer vehicle, simultaneously.

Still another embodiment relates to a washout system for a concrete mixer vehicle. The washout system includes a plurality of valves, a plurality of nozzles, and a controller. The plurality of valves are configured to (i) be fluidly coupled to a pump and a fluid tank and (ii) receive a fluid from the pump. One or more of the plurality of nozzles are fluidly coupled to a respective one of the plurality of valves. Each of the plurality of nozzles are configured to provide the fluid to a respective target when the respective one of the plurality of valves is selectively activated to an open position. The controller is configured to monitor a plurality of washout parameters during operation of the concrete mixer vehicle and initiate one of a plurality of washout modes in response to a subset of the plurality of washout parameters being satisfied for the one of the plurality of washout modes. Initiating at least one of the plurality of washout modes includes activating one or more of the plurality of valves such that the nozzles associated with the one or more of the plurality of valves provide the fluid to at least two of a charge hopper, an interior of a mixing drum, an exterior of the mixing drum, a discharge hopper, and a chute of the concrete mixer vehicle, simultaneously.

The invention is capable of other embodiments and of being carried out in various ways. Alternative exemplary embodiments relate to other features and combinations of features, as may be recited in the claims.

BRIEF DESCRIPTION OF THE DRAWINGS

The invention will become more fully understood from the following detailed description taken in conjunction with the accompanying drawings wherein like reference numerals refer to like elements, in which:

FIGS. 20-26 are flow diagrams of a method for controlling an automatic washout system according to various modes, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a concrete mixing truck includes a mixing drum, a mixing element, a charge hopper, a discharge hopper, and a chute. The concrete mixing truck also includes a tank, an electronically controllable valve that is in fluid communication with the tank, and at least one nozzle that is fluid communication with the electronically controllable valve. The concrete mixing truck also includes an automatic washout system that controls the electronically controllable valve according to commands from a user and/or instructions from a fleet manager. The automatic washout system selectively opens at least one of the electronically controllable valves to cause the at least one nozzle to clean a portion of the concrete mixing vehicle. The nozzles cause fluid to be propelled towards a portion of the concrete mixing vehicle, thereby causing any solids on that portion to become dislodged. In some applications, fluid propelled from the nozzles is contained, or substantially contained, within the mixing drum such that no discharge of the fluid and solids, if present, to the ground occurs. The automatic washout systems can control which of the nozzles provides fluid, how much fluid is provided, and the pressure of the fluid provided, among other parameters. A number of the concrete mixing trucks may include the automatic washout system. The automatic washout systems for each of the concrete mixing trucks may be controlled together or separately. Control of the automatic washout system may be based on location of the concrete mixing truck, the type of concrete that the concrete mixing truck is transporting, the type of concrete mixing truck, and other similar parameters.

The Concrete Mixing Truck

Figure 1:
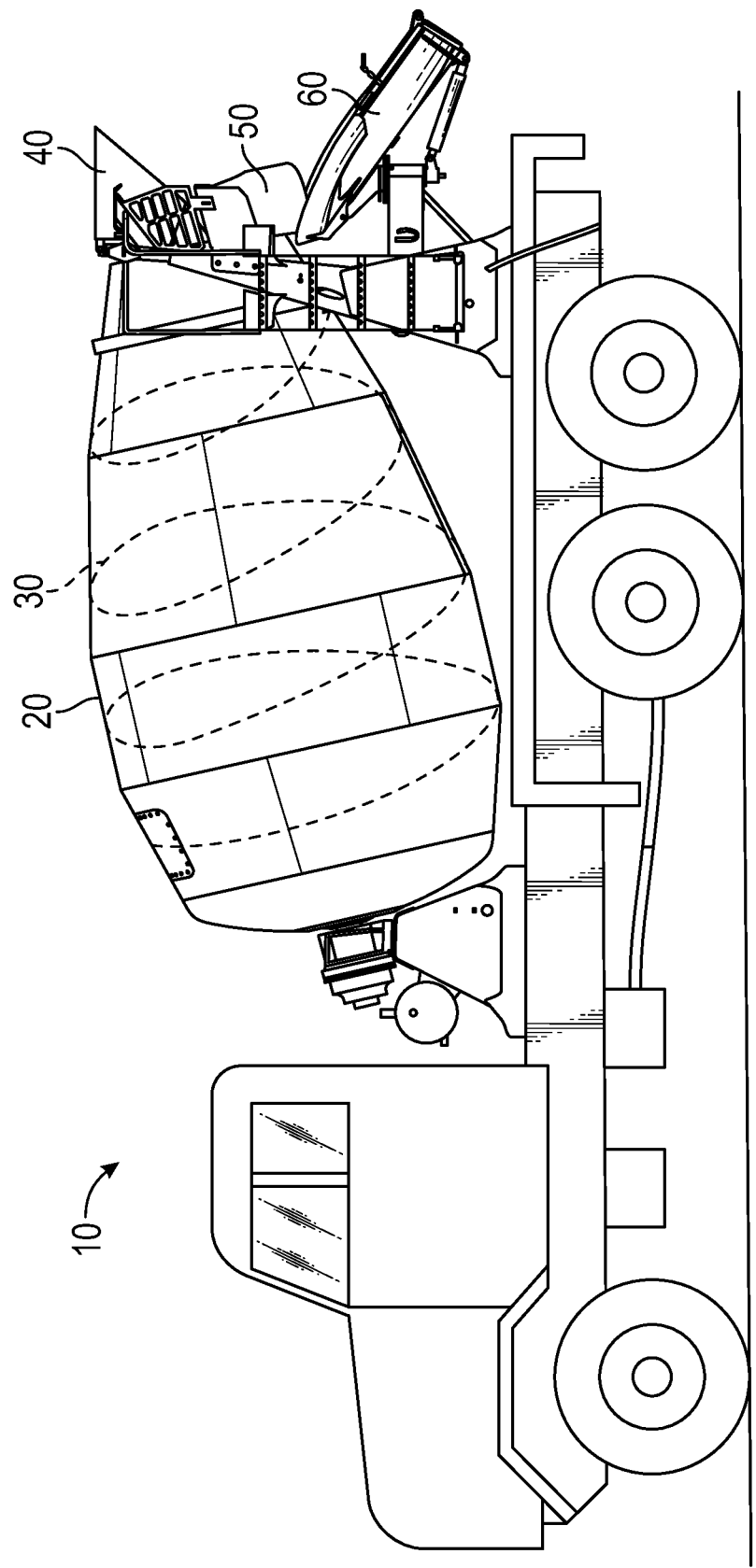
FIG. 1 is a schematic diagram of a concrete mixing truck, according to an exemplary embodiment.

According to the exemplary embodiment shown in FIGS. 1, 3, and 6-18, a vehicle, shown as a concrete mixing truck 10, includes a drum assembly, shown as a mixing drum 20. According to an exemplary embodiment, the concrete mixing truck 10 is configured as a rear-discharge concrete mixing truck. In other embodiments, the concrete mixing truck 10 is configured as a front-discharge concrete mixing truck. As shown in FIG. 1, the concrete mixing truck 10 includes a frame and a cab coupled to the frame (e.g., at a front end thereof, etc.). The mixing drum 20 is coupled to the frame and disposed behind the cab (e.g., at a rear end thereof, etc.), according to the exemplary embodiment shown in FIG. 1. In other embodiments, such as the embodiment shown in FIG. 3, at least a portion of the mixing drum 20 extends beyond the front of the cab. The cab may include various components to facilitate operation of the concrete mixing truck 10 by an operator (e.g., a seat, a steering wheel, hydraulic controls, a control panel, a control device, a user interface, switches, buttons, dials, etc.).

The concrete mixing truck 10 also includes an engine. For example, the engine may be coupled to the frame at a position beneath the cab. The engine may be configured to utilize one or more of a variety of fuels (e.g., gasoline, diesel, bio-diesel, ethanol, natural gas, etc.), according to various exemplary embodiments. According to an alternative embodiment, the engine additionally or alternatively includes one or more electric motors coupled to the frame (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 10.

The concrete mixing truck 10 may also include a transmission that is coupled to the engine. The engine produces mechanical power (e.g., due to a combustion reaction, etc.) that may flow into the transmission. The concrete mixing truck 10 may include a vehicle drive system that is coupled to the transmission. The vehicle drive system may include drive shafts, differentials, and other components coupling the transmission with a ground surface to move the concrete mixing truck 10. The concrete mixing truck 10 may also include a plurality of tractive elements, such as wheels, that engage a ground surface to move the concrete mixing truck 10. In one embodiment, at least a portion of the mechanical power produced by the engine flows through the transmission and into the vehicle drive system to power at least some of the wheels (e.g., front wheels, rear wheels, etc.). In one embodiment, energy (e.g., mechanical energy, etc.) flows along a power path defined from the engine, through the transmission, and to the vehicle drive system.

Figure 3:
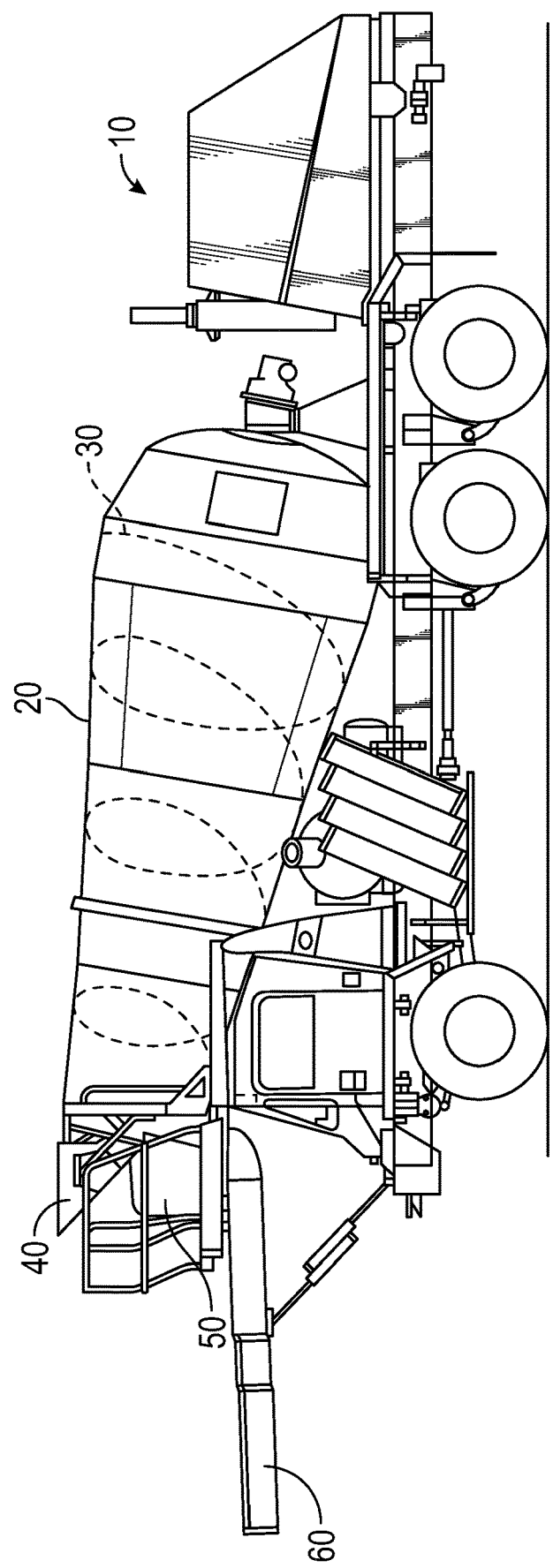
FIG. 3 is a schematic diagram of a concrete mixing truck, according to another exemplary embodiment.

As shown in FIGS. 1 and 3, the mixing drum 20 includes a mixing element (e.g., fins, etc.), shown as a mixing element 30, positioned within the interior of the mixing drum 20. The mixing element 30 may be configured to (i) mix the contents of mixture within the mixing drum 20 when the mixing drum 20 is rotated (e.g., by a drum drive system) in a first direction (e.g., counterclockwise, clockwise, etc.) and (ii) drive the mixture within the mixing drum 20 out of the mixing drum 20 (e.g., through a chute, etc.) when the mixing drum 20 is rotated (e.g., by a drum drive system) in an opposing second direction (e.g., clockwise, counterclockwise, etc.). The concrete mixing truck 10 also includes an inlet (e.g., hopper, etc.), shown as charge hopper 40, a connecting structure (e.g., a collector, a collection hopper, etc.), shown as discharge hopper 50, and an outlet, shown as chute 60. The charge hopper 40 is fluidly coupled with the mixing drum 20, which is fluidly coupled with the discharge hopper 50, which is fluidly coupled with the chute 60. In this way, wet or dry concrete may flow into the mixing drum 20 from the charge hopper 40 and wet concrete may flow out of the mixing drum 20 into the discharge hopper 50 and then into the chute 60 to be dispensed. According to an exemplary embodiment, the mixing drum 20 is configured to receive a mixture, such as a concrete mixture (e.g., cementitious material, aggregate, sand, rocks, etc.), through the charge hopper 40.

Figure 2:
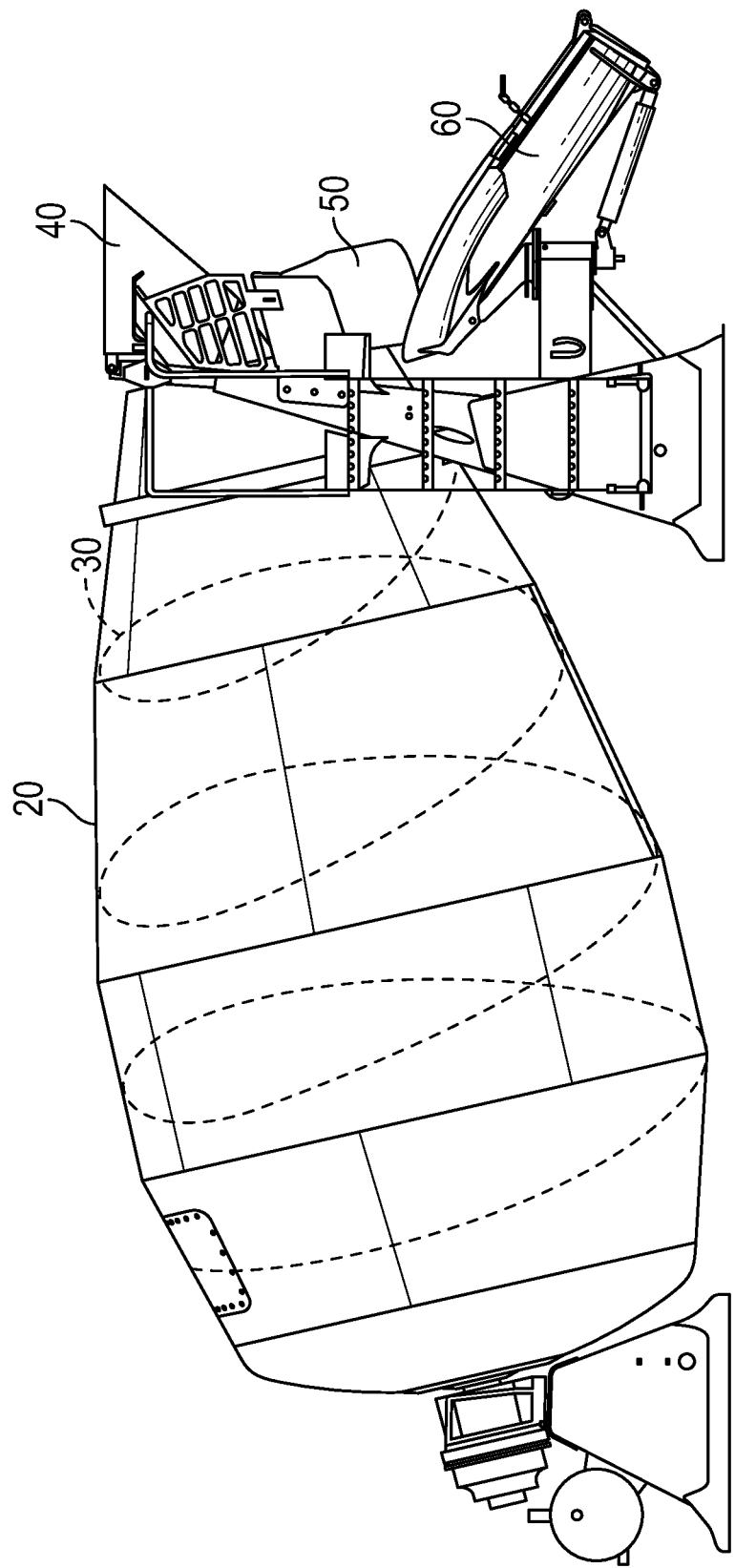
FIG. 2 is a schematic diagram of a mixing drum for a concrete mixing truck, according to an exemplary embodiment.

FIG. 2 illustrates the mixing drum 20, the mixing element 30, the charge hopper 40, the discharge hopper 50, and the chute 60 isolated from the concrete mixing truck 10. The mixing drum 20 may be coupled to supports (e.g., pedestals, etc.). These supports may be coupled to the frame of the concrete mixing truck 10. The supports may function to cooperatively couple (e.g., attach, secure, etc.) the mixing drum 20 to the frame and facilitate rotation of the mixing drum 20 relative to the frame. In an alternative embodiment, such as is shown in FIG. 2, the mixing drum 20 is configured as a stand-alone mixing drum that is not coupled (e.g., fixed, attached, etc.) to a vehicle. In such an embodiment, the mixing drum 20 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIG. 1, the mixing drum 20 defines a central, longitudinal axis. According to an exemplary embodiment, the mixing drum 20 is selectively rotated about this axis. The axis may be angled relative to the frame (e.g., of the concrete mixing truck 10) such that the axis intersects with the frame. For example, the axis may be elevated from the frame at an angle in the range of five degrees to twenty degrees. In other applications, the axis may be elevated by less than five degrees (e.g., four degrees, three degrees, etc.) or greater than twenty degrees (e.g., twenty-five degrees, thirty degrees, etc.). In an alternative embodiment, the concrete mixing truck 10 includes an actuator positioned to facilitate selectively adjusting the axis to a desired or target angle (e.g., manually in response to an operator input/command, automatically according to a control scheme, etc.).

The Automatic Washout System

Concrete trucks include drums that are filled with concrete at a concrete batch plant. The concrete trucks transport the concrete to a worksite and then dispense the concrete. The concrete trucks are periodically washed with fluids to prevent the buildup and formation of at least partially solidified concrete. This washing may be performed at regular intervals (e.g., daily, etc.) or after each load of concrete has been dispensed. Failure to perform regular washing could decrease the efficiency of the concrete truck or could require intensive cleaning of the concrete truck. In some applications, concrete trucks are washed with a hose (e.g., garden hose, etc.). However, this is an arduous and lengthy process that is undesirable.

Some concrete trucks include washing systems that utilize manually-controlled valves to provide flush water for distribution (e.g., through the use of a garden hoses and sprayer, etc.). The valves receive water from a tank on the concrete truck that is typically filled at the concrete batch plant. The manually-controlled valves have to be physically opened and closed by a user (e.g., by turning a wheel, etc.), and the user manually sprays the vehicle components. It is common for operators using manually-controlled valves to use an excess amount of fluid to wash the concrete truck. Because periodic washing of the concrete truck is required, and because excess fluid is often used, the tanks on these conventional concrete trucks are often depleted quickly. As a result, the tanks may need to be refilled, potentially interrupting valuable service time provided by the concrete truck. Manual valve systems may also permit operators to deplete the water tank supply below a level needed to maintain or adjust the consistency (e.g., slump, etc.) of the concrete while en route to or at a jobsite.

Further, these conventional concrete trucks are often designed to discharge a wash mixture (e.g., waste water and concrete, etc.) onto the ground. Discharging of the fluid-concrete mixture may be regulated or prohibited in some localities. As a result, conventional concrete trucks may require intensive cleaning, may waste fluid, and may perform inefficiently and undesirably (e.g., in a costly manner, etc.) because of the use of manually-controlled valves.

Figure 4:
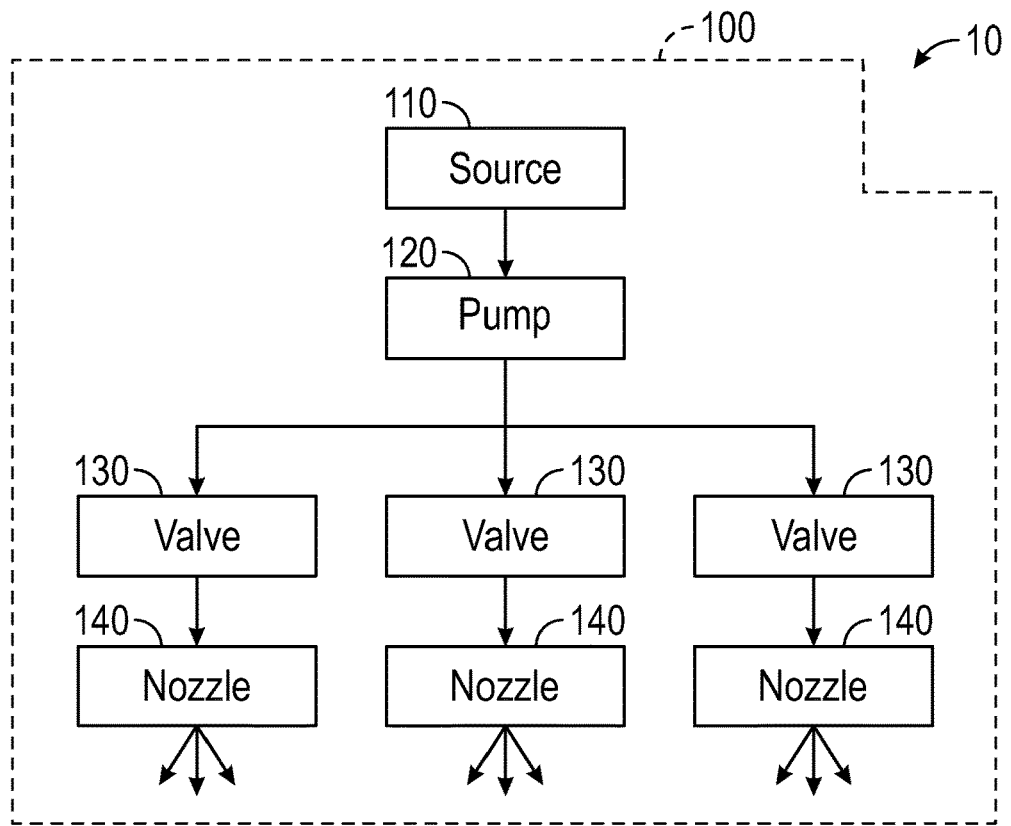
FIGS. 4 and 5 are block diagrams of an automatic washout system for a concrete mixing truck, according to an exemplary embodiment.

As shown in FIG. 4, the concrete mixing truck 10 includes a system, shown as an automatic washout system 100. The automatic washout system 100 facilitates cleaning of a target within the concrete mixing truck 10 (e.g., the mixing drum 20, the mixing element 30, the charge hopper 40, the discharge hopper 50, the chute 60, etc.). The automatic washout system 100 includes a reservoir (e.g., tank, etc.), shown as source 110, and a pump, shown as pump 120. The source 110 is configured to store a fluid (e.g., water, non-potable water, treated water, etc.) and the pump 120 is configured to draw the fluid from the source 110. The source 110 may be, for example, a one-hundred gallon water tank. However, the source 110 may also have other similar capacities (e.g., sixty-five gallons, ninety gallons, one-hundred and twenty-five gallons, one-hundred and fifty gallons, two-hundred gallons, two-hundred and fifty gallons, three-hundred gallons, three-hundred and eighty-five gallons, etc.). The source 110 is fluidly coupled to the pump 120. The source 110 may be configured to selectively dose the fluid with a cleaning agent to facilitate accelerated cleaning of a target.

The automatic washout system 100 also includes a plurality of valves (e.g., solenoids, electronic valves, electronic ball valves, electromagnetic valves, etc.), shown as electronically controllable valves 130, and a plurality of nozzles (e.g., sprayers, heads, slurry nozzles, etc.), shown as nozzles 140. The electronically controllable valves 130 are each fluidly coupled to the pump 120, such that fluid can be drawn from the source 110 by the pump 120 and provided to the electronically controllable valves 130. The pump 120, the electronically controllable valves 130, and the nozzles 140 are connected through the use of various fluid conduits (e.g., hoses, pipes, fittings, etc.). The electronically controllable valves 130 may each selectively provide the fluid to one or more of the nozzles 140. For example, some of the electronically controllable valves 130 may provide the fluid to two or more nozzles 140 while others of the electronically controllable valves 130 each provide the fluid to one nozzle 140. In one embodiment, the number of electronically controllable valves 130 is equal to the number of nozzles 140.

The nozzles 140 are each defined by a target that is provided fluid when the nozzle 140 receives fluid from the corresponding electronically controllable valve 130. The targets of the nozzles 140 may be, for example, the mixing drum 20 (e.g., the front of the mixing drum 20, the rear of the mixing drum 20, etc.), the mixing element 30 (e.g., the edges of the mixing element 30, the center of the mixing element 30, etc.), the charge hopper 40 (e.g., an inlet of the charge hopper 40, an outlet of the charge hopper 40, an interior surface of the charge hopper 40, an exterior surface of the charge hopper 40, etc.), the discharge hopper 50 (e.g., an inlet of the discharge hopper 50, an outlet of the discharge hopper 50, an interior surface of the discharge hopper 50, an exterior surface of the discharge hopper 50, etc.), and the chute 60 (e.g., an inlet of the chute 60, an outlet of the chute 60, an interior surface of the chute 60, etc.). Each nozzle 140 may have a different target, or multiple nozzles 140 may have the same target. The nozzles 140 may be automatically or manually adjustable such that the target of each of the nozzles 140 may be tailored for a target application of the concrete mixing truck 10.

The nozzles 140 function to remove solids (e.g., wet cement, dried cement, slurry, debris, deposits, etc.) from the targets, thereby cleaning the targets. By cleaning the targets, the automatic washout system 100 increases the longevity (e.g., service life, etc.) and desirability of the targets. In some applications, cleaning of the targets may be required by customer demands, regulatory requirements, industry standards, or other similar requirements. After the fluid is discharged by the nozzle 140 towards the target, the fluid may flow, for example, into the mixing drum 20.

In one example, a nozzle 140 is positioned within the charge hopper 40. When fluid is provided through this nozzle 140, the fluid may wash solids off of the charge hopper 40. The combination of the fluid and the solids washed from the charge hopper 40 may flow into, and be stored in, the mixing drum 20. In another example, a nozzle 140 is positioned within the discharge hopper 50. When fluid is provided through this nozzle 140, the fluid may wash solids off of the discharge hopper 50. The combination of the fluid and the solids washed from the discharge hopper 50 may be discharged onto the ground (e.g., outside of the concrete mixing truck 10, etc.). In yet another example, a nozzle 140 is positioned within the chute 60. When fluid is provided through this nozzle 140, the fluid may wash solids off of the chute 60. The combination of the fluid and the solids washed from the chute 60 may also be discharged onto the ground (e.g., outside of the concrete mixing truck 10, etc.). In an alternative embodiment, the concrete mixing truck 10 includes a catch (e.g., gutter, reservoir, etc.) configured to collect fluid and solids discharged from the discharge hopper 50 and/or the chute 60. In this embodiment, the catch may substantially prevent fluid and solids from being discharged onto the ground.

Figure 5:
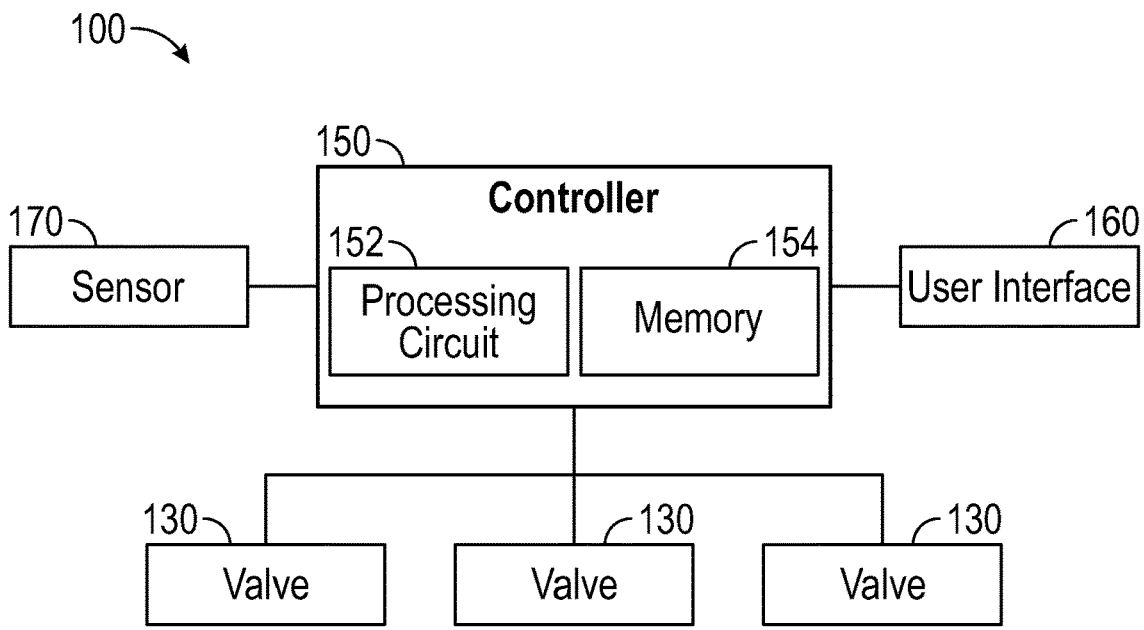
Figure 6:
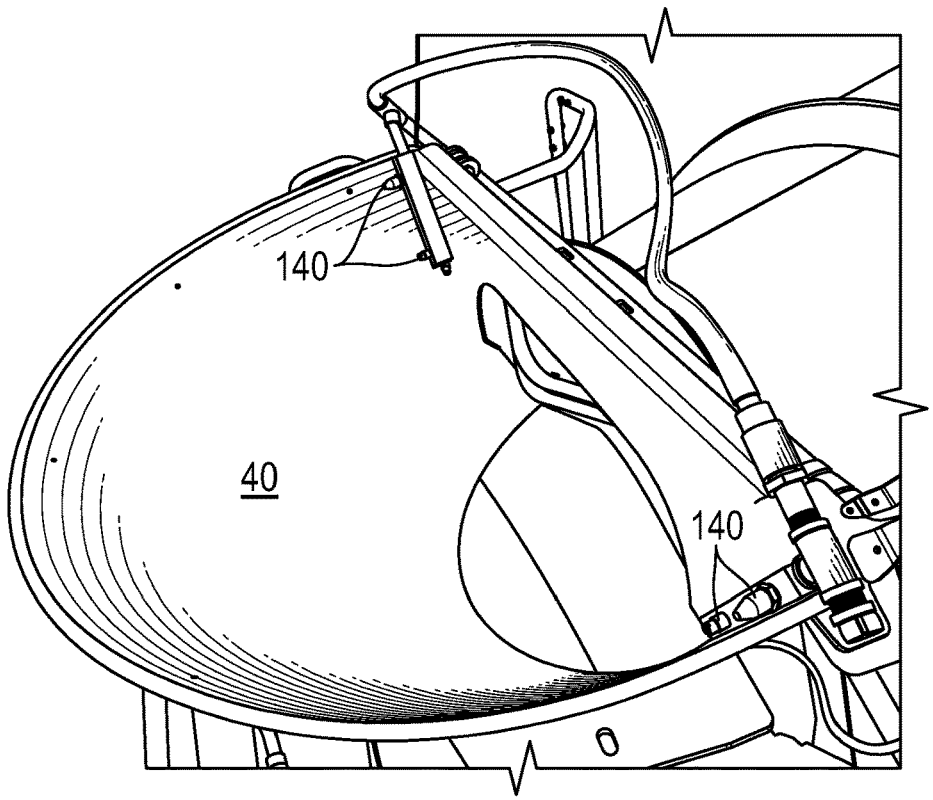
FIG. 6 is a detailed view of a charge hopper for a concrete mixing vehicle, including a number of nozzles mounted within the charge hopper, according to an exemplary embodiment.
Figure 7:
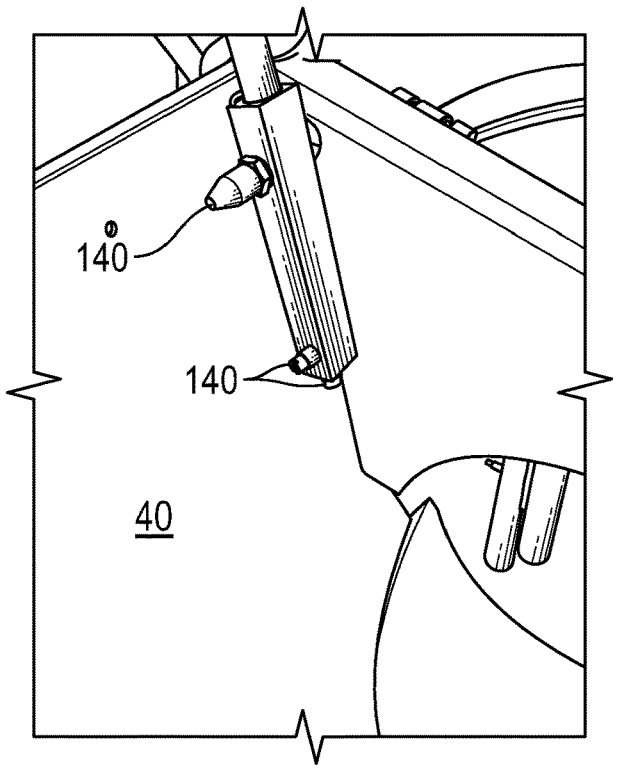
FIG. 7 is another detailed view of a charge hopper for a concrete mixing vehicle, including a number of nozzles mounted within the charge hopper, according to an exemplary embodiment.
Figure 9:
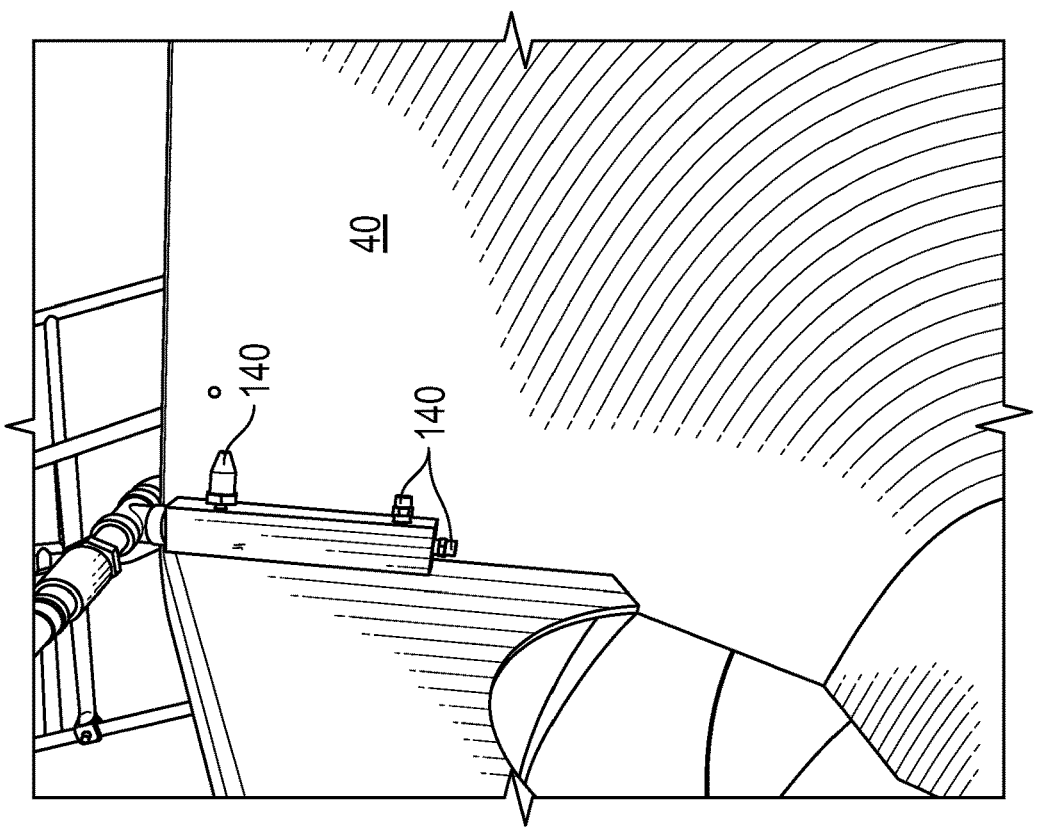
FIG. 9 is yet another detailed view of a charge hopper for a concrete mixing vehicle, including a number of nozzles mounted within the charge hopper, according to an exemplary embodiment.
Figure 8:
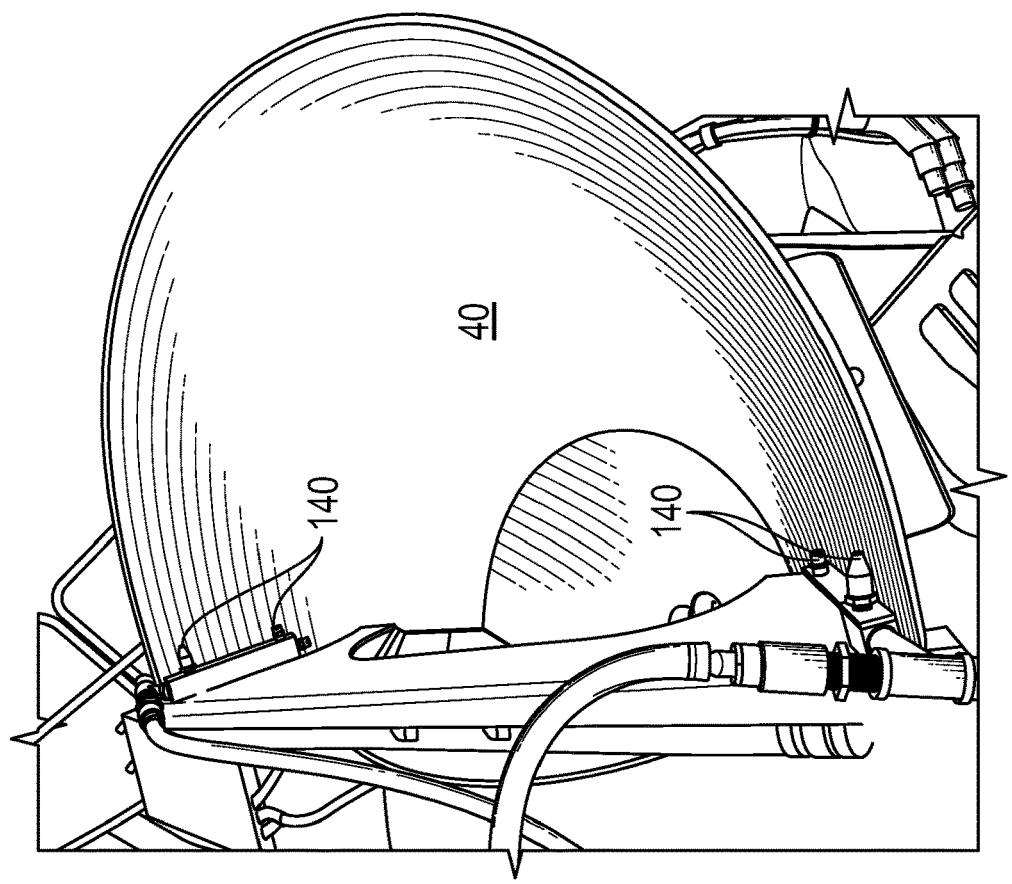
FIG. 8 is yet another detailed view of a charge hopper for a concrete mixing vehicle, including a number of nozzles mounted within the charge hopper, according to an exemplary embodiment.

As shown in FIG. 5, the automatic washout system 100 includes a controller (e.g., control unit, etc.), shown as controller 150, and an interface (e.g., human machine interface (HMI), guided user interface, software, application, etc.), shown as user interface 160. According to some embodiments, the controller 150 is integrated within body controls (e.g., McNeilus FLEX controls, etc.) for the mixing element 30. The controller 150 is electronically coupled to the user interface 160 and to the electronically controllable valves 130. The user interface 160 functions to receive inputs from a user (e.g., an operator of the concrete mixing truck 10, etc.). The controller 150 receives the inputs from the user interface 160 (e.g., via electronic communication, etc.) and provides commands to the electronically controllable valves 130.

The controller 150 includes a circuit (e.g., module, etc.), shown as a processing circuit 152, and a memory, shown as a memory 154. The processing circuit 152 and the memory 154 cooperate to interpret the inputs received from the user interface 160 and to structure the commands provided to the electronically controllable valves 130.

The controller 150 is configured to selectively engage, selectively disengage, control, and/or otherwise communicate with the electronically controllable valves 130 (e.g., actively control the components thereof, etc.). By way of example, the controller 150 may send and receive signals with the user interface 160, the electronically controllable valves 130, and any external device or computer. In one embodiment, the controller 150 is configured to selectively turn on and selectively turn off one or more of the various functionalities described herein. The controller 150 may turn on and turn off one or more of the various functionalities automatically, based on user requests during initial manufacture, and/or based on user input.

The controller 150 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. The controller 150 includes the processing circuit 152 which includes a processor, and the controller 150 also includes a memory 154. The processing circuit 152 may include an ASIC, one or more FPGAs, a DSP, circuits containing one or more processing components, circuitry for supporting a microprocessor, a group of processing components, or other suitable electronic processing components. In some embodiments, the processing circuit 152 is configured to execute computer code stored in the memory 154 to facilitate the activities described herein. The memory 154 may be any volatile or non-volatile computer-readable storage medium capable of storing data or computer code relating to the activities described herein. According to an exemplary embodiment, the memory 154 includes computer code modules (e.g., executable code, object code, source code, script code, machine code, etc.) configured for execution by the processing circuit 152. While the memory 154 may include various modules with particular functionality, it should be understood that the controller 150, the processing circuit 152, and the memory 154 may include any number of modules for completing the functions described herein. For example, the activities of multiple modules may be combined as a single module and additional modules with additional functionality may be included. Further, it should be understood that the controller 150 may further control other processes beyond the scope of the present disclosure.

The automatic washout system 100 may also include a sensor 170 that is electronically coupled to, and in electrical communication with, the controller 150. The sensor 170 provides sensor data to the controller 150. The controller 150 may utilize the sensor data when interpreting the inputs received from the user interface 160 and/or when structuring the commands provided to the electronically controllable valves 130. The controller 150 may also provide the sensor data to the user interface 160.

According to various embodiments, the user interface 160 is an electronic device (e.g., tablet, mobile electronic device, laptop, smart phone, personal electronic device, etc.). The user interface 160 may be operating an application or program that is configured to establish communication with the controller 150. In one embodiment, the user interface 160 is a tablet running an Android application that is configured to receive inputs from a user to transmit the input (e.g., wirelessly, via near field communications, via Wi-Fi, via Bluetooth, via a network connection, via a wired connection, etc.) to the controller 150.

In an exemplary embodiment, the user interface 160 provides the user with an image of the concrete mixing truck 10. The image includes several selectable buttons (e.g., icons, zones, etc.) corresponding to various targets within the mixing drum 20, within the mixing element 30, within the charge hopper 40, within the discharge hopper 50, and within the chute 60. When the user selects one of the buttons via the user interface 160, the user interface 160 transmits an input, corresponding to the selected button, to the controller 150. The controller 150 interprets the input to determine which targets the input corresponds with and then provides a command to the electronically controllable valve 130 associated with a nozzle 140 corresponding to the target. In this way, the user's selection on the user interface 160 facilitates a corresponding output of fluid to the target.

For each target, the user interface 160 may present the user with several options, each having a corresponding selectable button. For example, the user may be able to select various parameters such as a volume of fluid to provide to the target, an amount of time to provide fluid to the target, a pressure at which the fluid is to be provided to the target, a nozzle 140 through which the fluid is to be provided to the target, and other similar parameters. In this way, the user may utilize the user interface 160 to customize how, when, and where fluid is provided to any target or combination of targets. For example, the user interface 160 may allow the user to discharge ten gallons of water onto the mixing element 30 for thirty seconds.

In some embodiments, the user interface 160 presents the user with several selectable buttons, each corresponding to a different mode of operation of the automatic washout system 100. For example, the user interface 160 may present the user with a button corresponding to a "no mess" mode. Selection of this button may cause, for example, some of the electronically controllable valves 130 to open such that fluid is provided through all the nozzles 140 except the nozzles 140 corresponding to the chute 60. Use of the "no mess" mode may facilitate cleaning of targets while minimizing or eliminating the use of excess fluid that is discharged onto the ground. The user interface 160 may also present the user with a "rapid wash" mode. In the "rapid wash" mode, the controller 150 may instruct some of the electronically controllable valves 130 to open such that fluid is provided to only the nozzles 140 required to clean the solids from the mixing element 30 and the charge hopper 40 (e.g., pre-charge, post-charge, etc.). This operation of the electronically controllable valves 130 may prevent the combination of fluid and solids from being discharged onto the ground. The "rapid wash" mode may be particularly advantageous in applications where discharge of the combination of fluid and solids is regulated or prohibited. The "rapid wash" mode may also be advantageous where it is desirable to quickly prepare the concrete mixing truck 10 to receive wet cement (e.g., from a dispenser, etc.) or for storage. The user interface 160 may provide the user with the ability to select various wash modes of operation of the automatic washout system 100. By way of example, the automatic washout system 100 may be automatically and/or selectively operable in the "no mess" mode, the "rapid wash" mode, a "continuous wash" mode, a "wet down charge" mode, "a wet down discharge" mode, a "mix mode wash" mode, a "partial discharge wash" mode, and/or a "complete discharge wash" mode. The various washout modes of operation of the automatic washout system 100 are described with further detail herein.

In one embodiment, the user interface 160 displays prescribed limits on the volume of fluid available for the automatic washout system 100 to the user. These prescribed limits may dictate a maximum amount of fluid that the user can utilize (e.g., on a target basis, for each of the electronically controllable valves 130, for all of the electronically controllable valves 130, for each of the nozzles 140, for all of the nozzles 140, etc.). For example, the user interface 160 may display a prompt to the user stating that the mixing element 30 can only be cleaned with twenty gallons of fluid. Similar to prescribed limits on volume, the user interface 160 may display prescribed limits on the amount of time that fluid can be discharged for any or all of the electronically controllable valves 130 or nozzles 140. In some applications, the user may decide how to allocate the fluid to comply with the prescribed limit, such as by instructing various electronically controllable valves 130 to provide fluid according to various parameters (e.g., at various pressures, for various amounts of time, to provide various amounts of fluid, in various locations, etc.). In other applications, the controller 150 may present the user with an "automatic cleaning" mode. The "automatic cleaning" mode may present the user with a recommended usage of the electronically controllable valves 130 to comply with the prescribed limit. The user may then decide to select the "automatic cleaning" mode or to change various parameters recommended by the "automatic cleaning" mode. Alternatively, the controller 150 may not allow the user to change parameters set by the "automatic cleaning" mode.

The prescribed limits (e.g., on volume, on time, etc.) may be set by a fleet manager (e.g., supervisor, etc.). The fleet manager may be actively controlled by a supervisory user or may be passively controlled by a central computer system (e.g., server). The fleet manager may manage multiple concrete mixing trucks 10, each having the automatic washout system 100, and may use the prescribed limits to ensure desirable and efficient operation of the concrete mixing trucks 10. In these embodiments, the fleet manager may use a computer (e.g., computer system, personal electronic device, mobile device, smart phone, etc.) to transmit the prescribed limits to the controllers 150 in the automatic washout systems 100 for each of the concrete mixing trucks 10.

According to an exemplary embodiment, the controller 150 provides the fleet manager with a plurality of parameters associated with the concrete mixing truck 10. These parameters may be programmed into the memory 154, as accessed by the processing circuit 152, or may be obtained by the sensor 170, as interpreted by the processing circuit 152. For example, the sensor 170 may determine a viscosity (e.g., a type, etc.) of concrete in the mixing drum 20, a level of fluid in the tank, an amount of concrete in the mixing drum 20, a location of the concrete mixing truck 10 (e.g., via a global positioning system, etc.), a fuel level of the concrete mixing truck 10, an environmental temperature, and/or other similar parameters. The memory 154 may store, for example, configuration data associated with the concrete mixing truck 10 (e.g., fleet number, serial number, vehicle identification number, make, model, etc.), a viscosity (e.g., type, etc.) of concrete in the mixing drum 20, maximum capacity of the mixing drum 20, maximum capacity of the tank for fluid, maximum fuel capacity, location history (e.g., obtained from the sensor 170 and stored in the memory 154 by the processing circuit 152), and/or other similar parameters.

Following this embodiment, the fleet manager may analyze these parameters and determine (e.g., through the use of a computer system, etc.) instructions for the controller 150 for washing the concrete mixing truck 10. For example, the fleet manager can specify how often each target within the concrete mixing truck 10 is cleaned, in which order targets within the concrete mixing truck 10 are cleaned, how much fluid is used to clean each target within the concrete mixing truck 10, and which of the electronically controllable valves 130 are opened and closed when each of target within the concrete mixing truck 10 is cleaned. After determining the instructions, the fleet manager can transmit the instructions to the controller 150 for a specific concrete mixing truck or for a group of concrete mixing trucks 10. For example, the fleet manager can transmit the same instructions to all of the concrete mixing trucks 10 that are a specific model. These instructions are downloaded by the controller 150 and transmitted to the user interface 160. In some applications, the instructions transmitted by the fleet manager can be changed on a load by load basis for the concrete mixing truck 10. For example, if the fleet manager knows that a first load taken by the concrete mixing vehicle is to deliver a first type of concrete the fleet manager may transmit a first set of instructions whereas the fleet manager may transmit a second set of instructions when the concrete mixing vehicle is instead delivering a second type of concrete. In this way, the fleet manager can actively schedule the instructions based upon a load delivery schedule.

The user interface may provide the user with a "wash" mode, where the instructions transmitted by the fleet manager will be performed. In some instances, no other modes (e.g., the "no mess" mode, the "rapid wash" mode, etc.) are available for selection and the user can only utilize the automatic washout system 100 by selecting the "wash" mode. In some alternative applications, the "wash" mode is executed automatically by the controller 150. In these applications, the "wash" mode may be executed based on a location of the concrete mixing truck 10, based on an amount of fluid in the fluid tank, based on a time of day, based on an ambient temperature, or based on other similar variables, such as the parameters obtained by the sensor 170.

FIGS. 6-20 illustrate the concrete mixing truck 10 in detail according to various embodiments. As shown in FIGS. 6-9, the concrete mixing truck 10 includes six nozzles 140 mounted within the charge hopper 40. The nozzles 140 are mounted against a linear interior face of the charge hopper 40. Some of the nozzles 140 are oriented such that fluid can be propelled along the curved surface of the charge hopper 40. Others of the nozzles 140 are directed downwards and into an aperture of the charge hopper 40 such that fluid can be propelled downwards into the mixing drum 20. In operation, the fluid propelled from the nozzles 140 may cause solids to become dislodged from the charge hopper 40. The combination of fluids and solids may flow through the charge hopper 40 and into the mixing drum 20. According to one embodiment, the nozzles 140 are positioned in series along the same fluid conduit and thereby connected to the same electronically controllable valve 130. In other embodiments, at least some of the nozzles 140 are connected to different fluid conduits and thereby may be connected to different electronically controllable valves 130.

Figure 10:
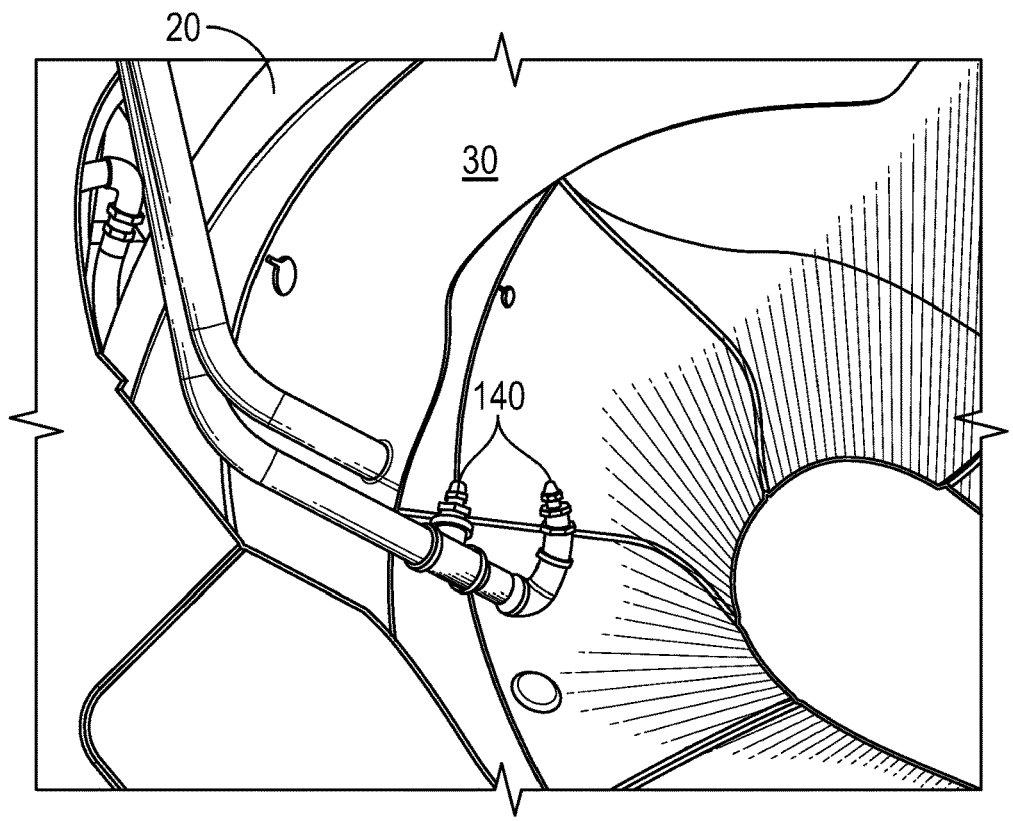
FIG. 10 is a detailed view of a mixing drum and a mixing element for a concrete mixing vehicle, including a number of nozzles mounted within the mixing drum, according to an exemplary embodiment.
Figure 11:
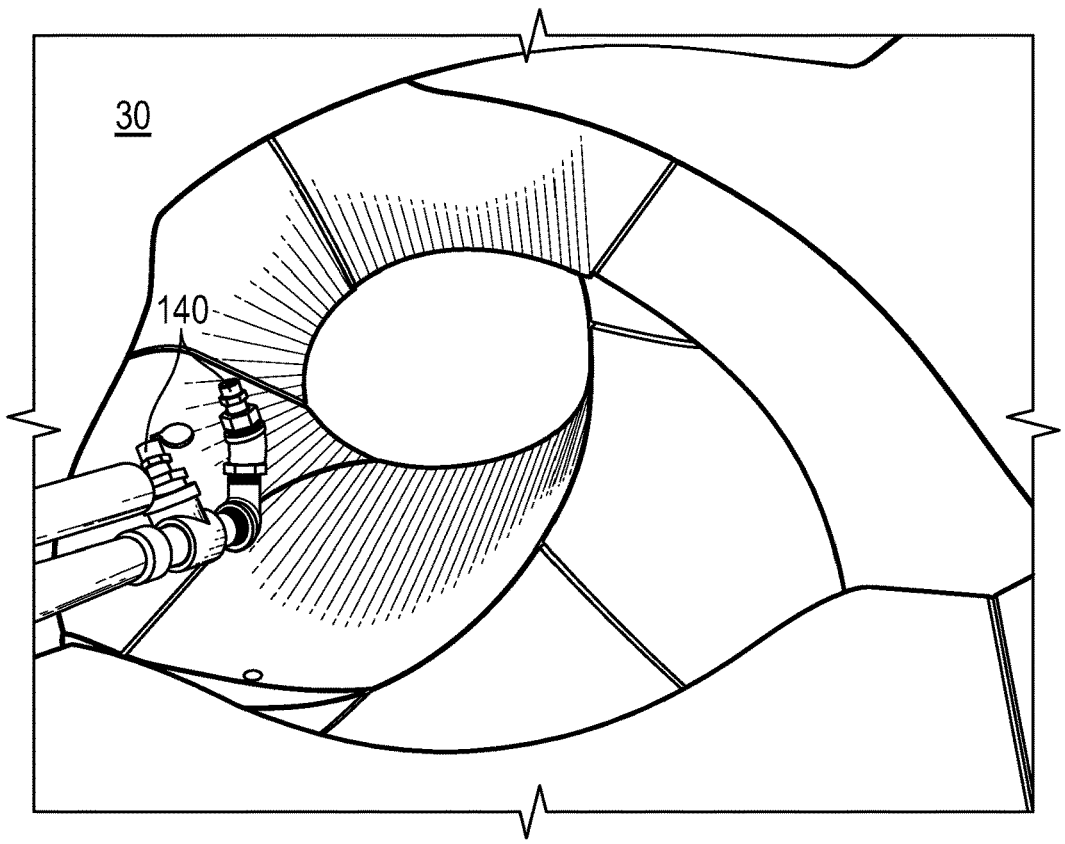
FIG. 11 is another detailed view of a mixing drum and a mixing element for a concrete mixing vehicle, including a number of nozzles mounted within the mixing drum, according to an exemplary embodiment.
Figure 12:
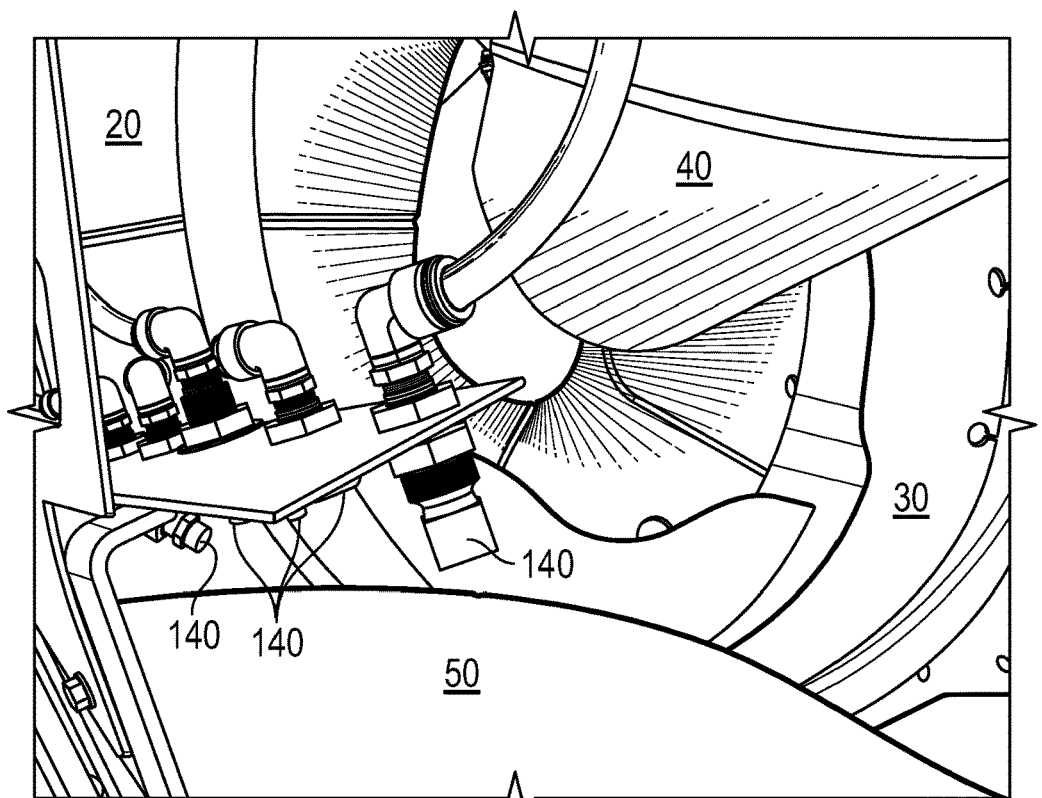
FIG. 12 is a detailed view of a mixing drum, a mixing element, a charge hopper, and a discharge hopper for a concrete mixing vehicle, including a number of nozzles mounted near the discharge hopper, according to an exemplary embodiment.

As shown in FIGS. 10 and 11, the concrete mixing truck 10 includes two nozzles 140 mounted within the mixing drum 20. The nozzles 140 extend into the mixing drum 20 and may be oriented to direct fluid towards an inner surface of the mixing drum 20 and/or the mixing element 30. The nozzles 140 may function to dislodge solids from the inner surface of the mixing drum 20 and/or from the mixing element 30. In these applications, the combination of fluid and solids may be retained within the mixing drum 20. The nozzles 140 may also function to add water to the mixing drum 20 to change the slump of concrete within the mixing drum.

Figure 16:
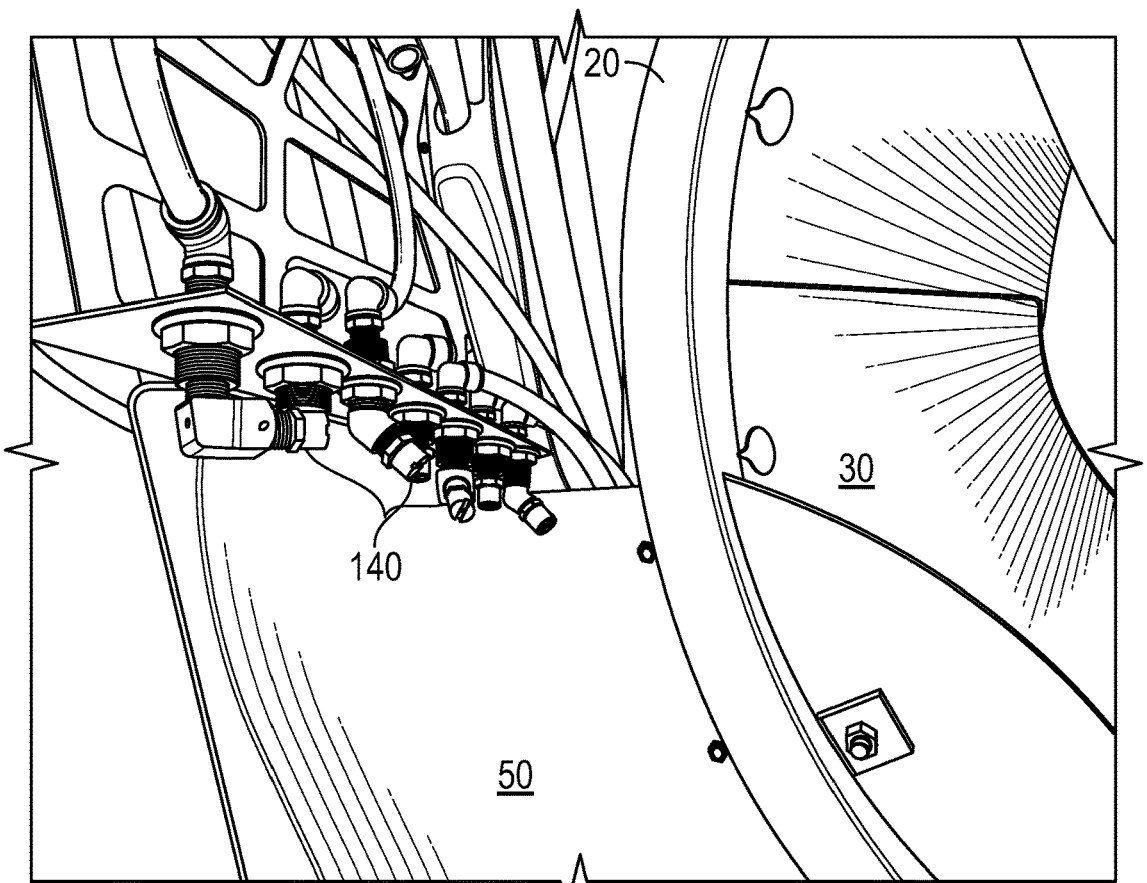
FIG. 16 is yet another detailed view of a mixing drum, a mixing element, a charge hopper, and a discharge hopper for a concrete mixing vehicle, including a number of nozzles mounted near the discharge hopper, according to an exemplary embodiment.

Referring to FIGS. 12 and 14-16, the concrete mixing truck 10 includes multiple nozzles 140 mounted between the charge hopper 40 and the discharge hopper 50. These nozzles 140 may be mounted on a common mounting plate. These nozzles 140 may be oriented towards any of the mixing drum 20, the mixing element 30, the charge hopper 40, the discharge hopper 50, and the chute 60. For example, some of the nozzles 140 may be oriented towards the discharge hopper 50 such that solids on or within the discharge hopper can be dislodged by the fluid. At least a portion of the combination of fluid and solids that flows from the discharge hopper 50 can flow through an aperture of the discharge hopper 50, into the chute 60, and discharged onto the ground. As shown in FIG. 16, the nozzles 140 may each be oriented at different targets. For example, some of the nozzles 140 may be oriented towards the chute 60 such that solids on or within the chute 60 can be dislodged by the fluid. Similarly, some of the nozzles 140 may be oriented towards an outside surface of the mixing drum 20 such that solids along the outside surface of the mixing drum 20 can be dislodged by the fluid. Some of the nozzles 140 may be oriented towards an outside surface of the charge hopper 40 such that solids along the outside surface of the charge hopper 40 can be dislodged by the fluid.

Figure 13:
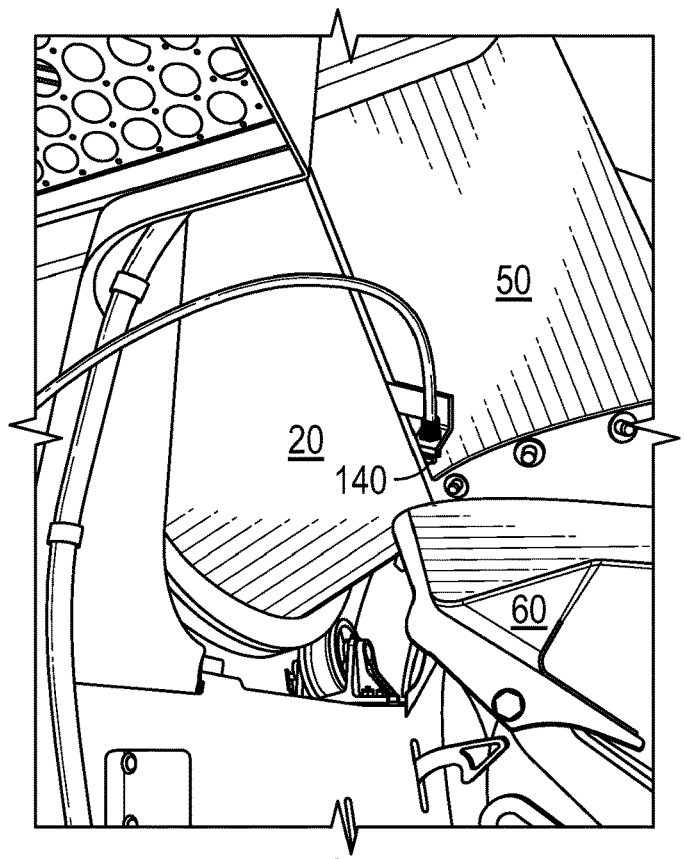
FIG. 13 is a detailed view of a mixing drum, a discharge hopper, and a chute for a concrete mixing vehicle, including a nozzles mounted underneath the discharge hopper, according to an exemplary embodiment.
Figure 14:
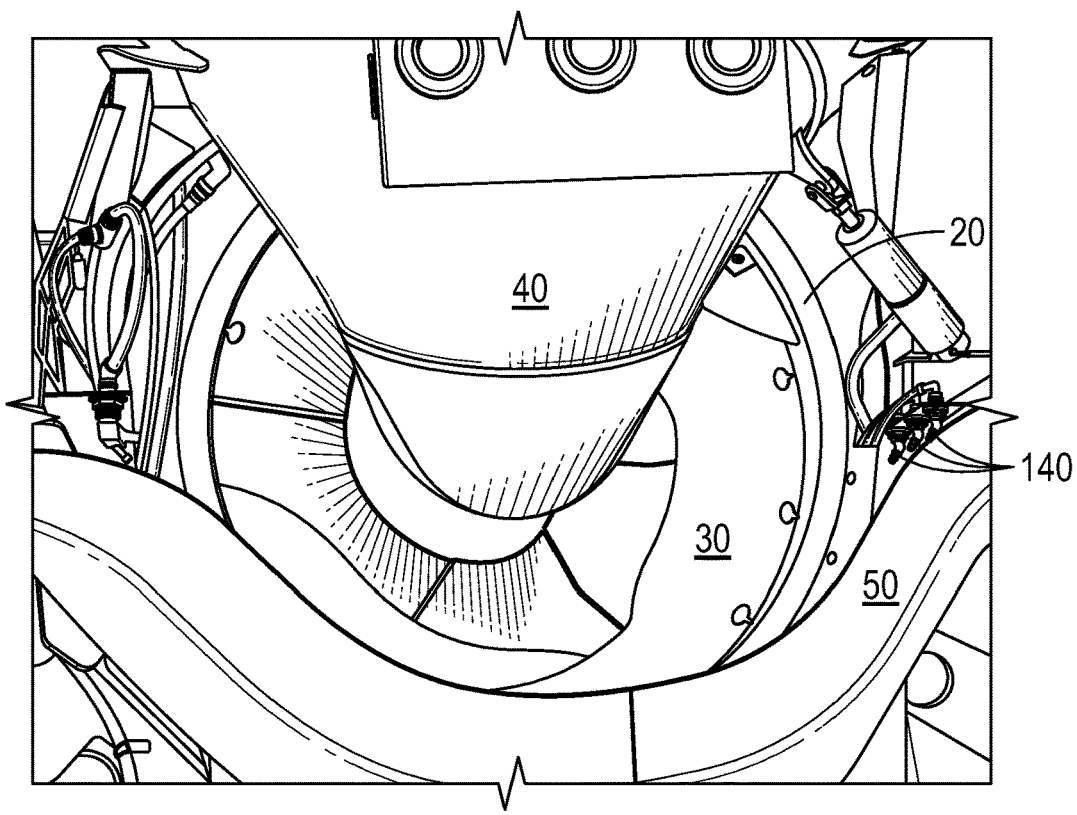
FIG. 14 is another detailed view of a mixing drum, a mixing element, a charge hopper, and a discharge hopper for a concrete mixing vehicle, including a number of nozzles mounted near the discharge hopper, according to an exemplary embodiment.
Figure 15:
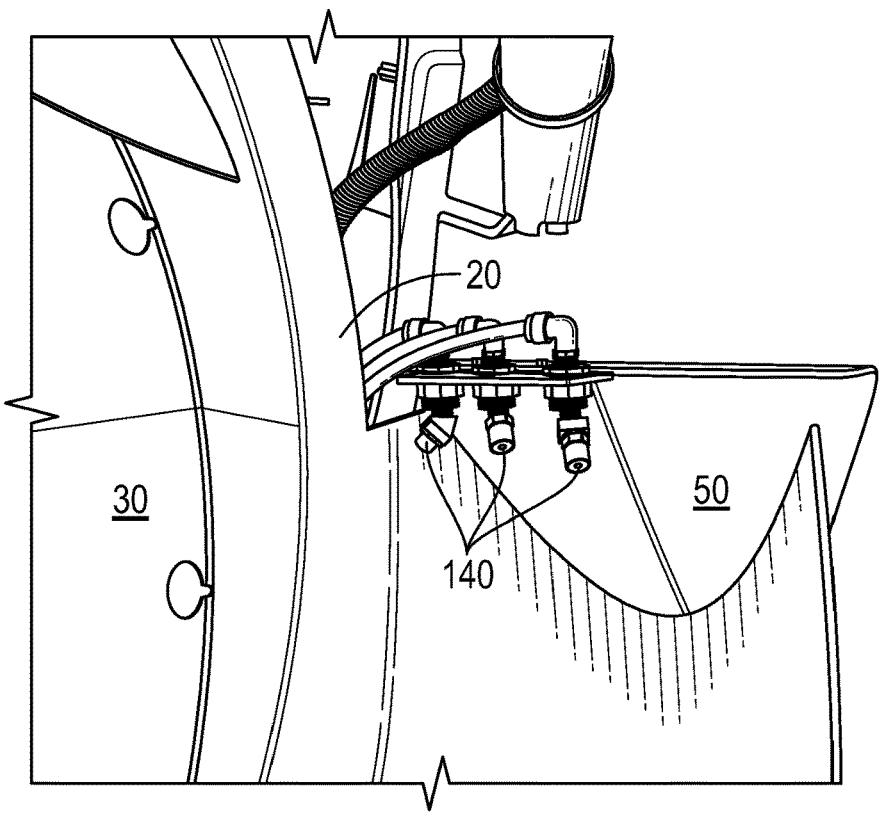
FIG. 15 is yet another detailed view of a mixing drum, a mixing element, a charge hopper, and a discharge hopper for a concrete mixing vehicle, including a number of nozzles mounted near the discharge hopper, according to an exemplary embodiment.

As shown in FIG. 13, the concrete mixing truck 10 includes a nozzle 140 mounted underneath the discharge hopper 50. This nozzle 140 may be oriented towards a gap between the discharge hopper 50 and the chute 60. This nozzle 140 may direct fluid into this gap such that solids within the gap are dislodged by the fluid. Similarly, a nozzle 140 may be oriented towards a junction between the mixing drum 20 and the discharge hopper 50.

Figure 17:
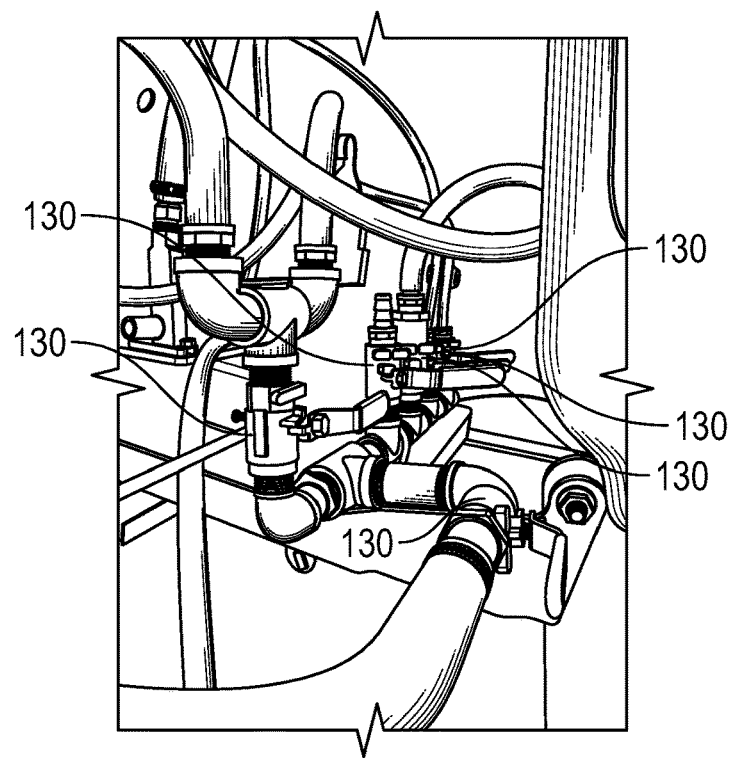
FIG. 17 is a detailed view of a number of valves for a concrete mixing vehicle, according to an exemplary embodiment.
Figure 18:
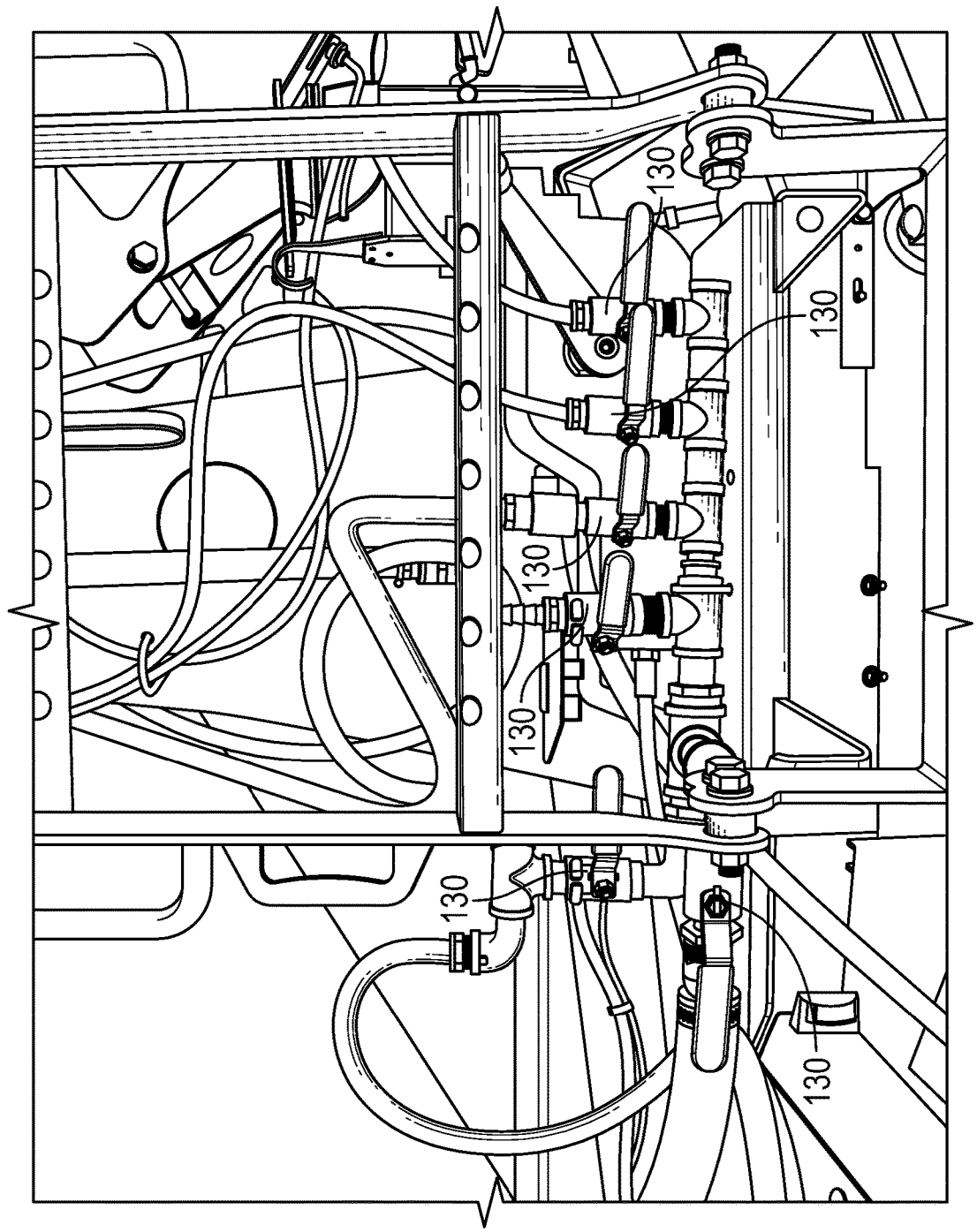
FIG. 18 is another detailed view of a number of valves for a concrete mixing vehicle, according to an exemplary embodiment.

As shown in FIGS. 17 and 18 the electronically controllable valves 130 may be connected to a main header in parallel. In some embodiments, all of the electronically controllable valves 130 are two-way valves. However, some or all of the electronically controllable valves 130 may also be three-way valves, or any other similar valve. The electronically controllable valves 130 may include a manual override, an emergency stop, a testing function, a maintenance function, or other similar features.

According to an exemplary embodiment, the automatic washout system 100 is automatically and/or selectively operable in various washout modes including the no mess mode, the rapid wash mode, the wet down charge mode, the mix mode wash mode, the wet down discharge mode, the partial discharge wash mode, the complete discharge wash mode, and/or the continuous wash mode. The various washout modes may be selectively initiated by an operator (e.g., using the user interface 160, manually activating the valves 130, etc.) and/or automatically initiated by the controller 150 based on various inputs, data, washout parameters, etc.

By way of example, the no mess mode may be operator initiated to clean various targets with the nozzles 140, while preventing water and/or concrete from exiting the mixer system and falling to the ground. For example, the electronically controllable valves 130 associated with the nozzles 140 positioned to facilitate cleaning the mixing drum 20, the mixing element 30, and/or the charge hopper 40 may be activated such that the respective targets are cleaned, while the nozzles 140 associated with the discharge hopper 50 and the chute 60 may remain deactivated such that water and/or concrete do not escape the mixer system through the discharge hopper 50 and the chute 60.

By way of another example, the rapid wash mode may be operator initiated to clean various targets with the nozzles 140. For example, the electronically controllable valves 130 associated with the nozzles 140 positioned to facilitate cleaning the mixing drum 20, the mixing element 30, and/or the charge hopper 40 may be activated such that the respective targets are cleaned for pre-charging, post-charging, and/or storage.

According to an exemplary embodiment, one or more of the various washout modes of operation of the automatic washout system 100 are automatically selected, initiated, and/or terminated based on one or more washout parameters. The washout parameters may include, but are not limited to, (i) a geofence (e.g., location information such as a job site, a batch plant site, a designated washout area, etc.; using GPS and/or other location based sensing technologies; etc.), (ii) an amount of concrete discharged from the mixing drum 20 (e.g., only a portion of the concrete has been discharged, all of the concrete has been discharged, measured via sensors, estimated, etc.), (iii) the quality of the concrete within the mixing drum 20 (e.g., slump, air content, temperature, etc.; measured with sensors; estimated; etc.), (iv) environmental parameters (e.g., ambient temperature, humidity, altitude, etc.; measured with sensors; received from a weather service based on current location; etc.), (v) operator acknowledgement (e.g., the operator confirms/approves automatic initiation of a respective wash mode, etc.), (vi) mixer system component sensor readings (e.g., to determine the location, position, orientation, etc. of the components of the mixer system such as the mixing drum 20, the chute 60, etc.), (vii) current active functions and previously active functions (e.g., mixing, charging, discharging, driving, stopped, etc.), (viii) job type (e.g., curb, foundation, pumper, etc.), and/or (ix) information and/or commands received using telematics (e.g., wireless/remote inputs, from a fleet manager, from a server, etc.).

By way of example, the wet down charge mode may be automatically initiated by the controller 150 in response to a first subset of the washout parameters being met. Additionally or alternatively, the wet down charge mode may be manually initiated by an operator of the concrete mixing truck 10. The controller 150 may initiate the wet down charge mode in response to (i) determining that the concrete mixing truck 10 is located at a batch plant site (e.g., determined based on GPS, a geofence, etc.), (ii) determining that the mixing drum 20 is empty (e.g., based on sensor readings, etc.), (iii) determining that the concrete mixing truck 10 is in a neutral or park gear, (iv) receiving an indication that the concrete mixing truck 10 is going to be charged with a concrete mixture (e.g., by an operator using the user interface 160, telematically from a batch plant computer or server, etc.), and/or (v) receiving an indication that the concrete mixture will be a wet mixture, not a dry mixture (e.g., by an operator using the user interface 160, telematically from a batch plant computer or server, etc.).

Initiating the wet down charge mode may include activating the electronically controllable valves 130 associated with the nozzles 140 positioned to facilitate cleaning and/or wetting the charge hopper 40. The wet down charge mode may include quickly misting or lightly spraying the charge hopper 40 prior to loading or charging the mixing drum 20 with a wet mixture. Such a pre-wetting step may facilitate the wet mixture in sliding into and through the charge hopper 40 into the mixing drum 20 more easily. The amount of water sprayed into the charge hopper 40 may be controlled according to a predetermined volume threshold and/or a predetermined time threshold.

By way of another example, the mix mode wash mode may be automatically initiated by the controller 150 in response to a second subset of the washout parameters being met. Additionally or alternatively, the mix mode wash mode may be manually initiated by an operator of the concrete mixing truck 10. The controller 150 may initiate the mix mode wash mode in response to (i) determining that the concrete mixing truck 10 is located at a batch plant (e.g., determined based on GPS, a geofence, etc.), (ii) determining that the mixing drum 20 was loaded with a concrete mixture (e.g., based on sensor readings, an operator input, etc.), (iii) determining that the concrete mixing truck 10 is in a neutral or park gear, and/or (iv) determining the mixing drum 20 is operating in a mix mode. The mixing drum 20 may be operated in the mix mode immediately after the mixing drum 20 is charged with a fresh concrete mixture or the ingredients thereof. In some embodiments, the mix mode includes rotating the mixing drum 20 at a speed of at least seven revolutions per minute ("RPM") for up to approximately seventy revolutions.

Initiating the mix mode wash mode may include activating the electronically controllable valves 130 associated with the nozzles 140 positioned to facilitate cleaning the charge hopper 40 and/or the interior of the mixing drum 20 (e.g., the mixing element 30 proximate the opening of the mixing drum 20, etc.) following the charging of the mixing drum 20. The amount of water sprayed into the charge hopper 40 and/or the interior of the mixing drum 20 may be controlled according to a predetermined volume threshold (e.g., to prevent the concrete-water ratio of the concrete mixture within the mixing drum 20 from being affected, etc.). Initiating the mix mode wash mode may additionally include activating the electronically controllable valves 130 associated with the nozzles 140 positioned to facilitate cleaning the exterior of the mixing drum 20, the discharge hopper 50, and/or the chute 60 following the charging of the mixing drum 20. The amount of water sprayed into/at the discharge hopper 50, the chute 60, and/or the exterior of the mixing drum 20 may be controlled according to a predetermined volume threshold and/or a predetermined time threshold.

By way of yet another example, the wet down discharge mode may be automatically initiated by the controller 150 in response to a third subset of the washout parameters being met. Additionally or alternatively, the wet down discharge mode may be manually initiated by an operator of the concrete mixing truck 10. The controller 150 may initiate the wet down discharge mode in response to (i) determining that the concrete mixing truck 10 is located at a job site (e.g., determined based on GPS, a geofence, etc.), (ii) determining that the concrete mixing truck 10 is in a neutral or park gear, (iii) determining that the chute 60 is in a discharge orientation (e.g., extended, unfolded, etc.; based on readings from a chute sensor; etc.), and/or (iv) receiving an indication that the concrete mixing truck 10 is going to discharge at least a portion of the concrete mixture (e.g., by an operator using the user interface 160, telematically from a batch plant computer or server, telematically from a job site computer or server, etc.).

Initiating the wet down discharge mode may include activating the electronically controllable valves 130 associated with the nozzles 140 positioned to facilitate cleaning and/or wetting the discharge hopper 50 and/or the chute 60. The wet down discharge mode may include quickly misting or lightly spraying the discharge hopper 50 and/or the chute 60 prior to discharging at least a portion of the concrete mixture from the mixing drum 20. Such a pre-wetting step may facilitate the concrete mixture in sliding into and through the discharge hopper 50 into the chute 60 to be deposited at a desired location more easily. The amount of water sprayed into the discharge hopper 50 and/or the chute 60 may be controlled according to a predetermined volume threshold and/or a predetermined time threshold. In some embodiments, the controller 150 is configured to provide an indication to the operator in response to the chute 60 not being in the discharge orientation (e.g., based on a chute sensor output, etc.). Configuring the chute 60 in the discharge orientation may ensure proper wetting of the chute 60.

By way of still another example, the partial discharge wash mode may be automatically initiated by the controller 150 in response to a fourth subset of the washout parameters being met (e.g., when there are one or more subsequent discharging stops for a current concrete load, pouring a couple of yards for a sidewalk and then going somewhere else to pour a few more yards for a patio pad, etc.). Additionally or alternatively, the partial discharge wash mode may be manually initiated by an operator of the concrete mixing truck 10. The controller 150 may initiate the partial discharge wash mode in response to (i) determining that the concrete mixing truck 10 is located at, leaving, or left a job site (e.g., determined based on GPS, a geofence, etc.), (ii) determining that the mixing drum 20 discharged a portion of the concrete mixture less than a total amount of the concrete mixture within the mixing drum 20 at the job site (e.g., based on sensor readings, based on an operator input, telematically from a batch plant computer or server, telematically from a job site computer or server, etc.), and/or (iii) receiving an indication that the concrete mixing truck 10 has one or more additional discharge stops to make (e.g., based on an operator input, telematically from a batch plant computer or server, etc.).

Initiating the partial discharge wash mode may include activating the electronically controllable valves 130 associated with the nozzles 140 positioned to facilitate cleaning the interior of the mixing drum 20 (e.g., the mixing element 30 proximate the opening of the mixing drum 20, etc.) following the partial discharge of the mixing drum 20. The amount of water sprayed into the interior of the mixing drum 20 may be controlled according to a predetermined volume threshold (e.g., to prevent the concrete-water ratio of the concrete mixture within the mixing drum 20 from being affected, etc.). Initiating the partial discharge wash mode may additionally or alternatively include activating the electronically controllable valves 130 associated with the nozzles 140 positioned to facilitate cleaning the exterior of the mixing drum 20, the discharge hopper 50, and/or the chute 60 following the partial discharge of the mixing drum 20. The amount of water sprayed into/at the discharge hopper 50, the chute 60, and/or the exterior of the mixing drum 20 may be controlled according to a predetermined volume threshold and/or a predetermined time threshold. The controller 150 may be configured to control the speed at which the mixing drum 20 rotates to ensure proper cleaning of the interior and/or exterior thereof during the partial discharge wash mode. In some embodiments, the controller 150 is configured to provide an indication to the operator in response to the chute 60 not being in the discharge orientation (e.g., based on a chute sensor output, etc.). Configuring the chute 60 in the discharge orientation may ensure proper cleaning of the chute 60 (e.g., preventing concrete from getting lodged in a seam or fold of the chute 60 when stowed, folded, etc.).

By way of a further example, the complete discharge wash mode may be automatically initiated by the controller 150 in response to a fifth subset of the washout parameters being met. Additionally or alternatively, the complete discharge wash mode may be manually initiated by an operator of the concrete mixing truck 10. The controller 150 may initiate the complete discharge wash mode in response to (i) determining that the concrete mixing truck 10 is located at, leaving, or left a job site (e.g., determined based on GPS, a geofence, etc.), (ii) determining that the concrete mixing truck 10 is on its way to or is at a batch plant site or a designated washout area (e.g., determined based on GPS, a geofence, etc.), (iii) determining that the mixing drum 20 discharged all of the concrete mixture within the mixing drum 20 (e.g., based on sensor readings, an operator input, etc.), and/or (iv) receiving an indication that the concrete mixing truck 10 has no more stops to make (e.g., based on an operator input, telematically from a batch plant computer or server, etc.).

Initiating the complete discharge wash mode may include activating the electronically controllable valves 130 associated with the nozzles 140 positioned to facilitate cleaning the interior of the mixing drum 20 (e.g., the mixing element 30 proximate the opening of the mixing drum 20, etc.), the exterior of the mixing drum 20, the discharge hopper 50, and/or the chute 60 following the complete discharge of the mixing drum 20. The amount of water sprayed into/at the discharge hopper 50, the chute 60, the interior of the mixing drum 20, and/or the exterior of the mixing drum 20 may be controlled according to a predetermined volume threshold and/or a predetermined time threshold. The controller 150 may be configured to control the speed at which the mixing drum 20 rotates to ensure proper cleaning of the interior and/or exterior thereof during the complete discharge wash mode. In some embodiments, the controller 150 is configured to provide an indication to the operator in response to the chute 60 not being in the discharge orientation (e.g., based on a chute sensor output, etc.). Configuring the chute 60 in the discharge orientation may ensure proper cleaning of the chute 60 (e.g., preventing concrete from getting lodged in a seam or fold of the chute 60 when stowed, folded, etc.).

By way of still a further example, the continuous wash mode may be automatically initiated by the controller 150 in response to a sixth subset of the washout parameters being met. Additionally or alternatively, the continuous wash mode may be manually initiated by an operator of the concrete mixing truck 10. The controller 150 may initiate the continuous wash mode in response to (i) receiving an indication (e.g., from an operator with the user interface 160, from an external computer or server, from a sensor, etc.) that the source 110 is coupled to a continuous water source (e.g., a refilling hose, a refilling pipe, etc.), (ii) determining that the concrete mixing truck 10 is located at a designated washout area (e.g., determined based on GPS, a geofence, etc.), (iii) determining that the concrete mixing truck 10 is in a neutral or park gear, and/or (iv) receiving an indication (e.g., from an operator with the user interface 160, from a batch plant computer or server, etc.) of a selected region to wash (e.g., the interior of the mixing drum 20, the exterior of the mixing drum 20, the charge hopper 40, the discharge hopper 50, the chute 60, etc.).

Initiating the continuous wash mode may include activating the electronically controllable valves 130 associated with the nozzles 140 positioned to facilitate cleaning the interior of the mixing drum 20, the exterior of the mixing drum 20, the charge hopper 40, the discharge hopper 50, and/or the chute 60. In some embodiments, the amount of water sprayed into/at the charge hopper 40, the discharge hopper 50, the chute 60, the interior of the mixing drum 20, and/or the exterior of the mixing drum 20 is controlled according to a predetermined volume threshold and/or a predetermined time threshold. In some embodiments, the amount of water sprayed into/at the charge hopper 40, the discharge hopper 50, the chute 60, the interior of the mixing drum 20, and/or the exterior of the mixing drum 20 is not controlled based on time or volume, but rather the electronically controllable valves 130 remain open until the controller 150 receives a stop request (e.g., from the operator with the user interface 160, from a batch plant computer or server, etc.). The controller 150 may be configured to control the speed at which the mixing drum 20 rotates to ensure proper cleaning of the interior and/or exterior thereof during the continuous wash mode. In some embodiments, the controller 150 is configured to provide an indication to the operator in response to the chute 60 not being in the discharge orientation (e.g., based on a chute sensor output, etc.). Configuring the chute 60 in the discharge orientation may ensure proper cleaning of the chute 60 (e.g., preventing concrete from getting lodged in a seam or fold of the chute 60 when stowed, folded, etc.). In some embodiments, a user operated hose is included and may be used by an operator of the concrete mixing truck 10 to provide additional cleaning to selected areas or components of the mixing system.

In some embodiments, the automatic washout system 100 is configured to activate different washout modes in succession and/or based on location and status of the concrete mixing truck 10 (e.g., the status of a transmission thereof, the status of the contents within the mixing drum 20, etc.). By way of example, the controller 150 may detect that the mixing drum 20 has been loaded and is mixing (e.g., at an elevated speed, etc.), and the concrete mixing truck 10 is stationary (e.g., based on the transmission thereof being in a neutral gear, a park gear, etc.). Such parameters may indicate the mixing drum 20 is performing an initial mix mode to mix the contents therein and initiate a first washout mode. The first washout mode may include the mix mode wash mode. Thereafter, the controller 150 may detect that the concrete mixing truck 10 is in transit to a discharge destination (e.g., based on the transmission being in a drive gear, etc.). The controller 150 may then monitor the location of the concrete mixing truck 10 until it enters or approaches the next scheduled job site (e.g., whether the concrete mixing truck 10 enters a job site geofence, etc.). The controller 150 may then prepare for activating or activate a second washout mode in preparation for discharge. In some embodiments, the controller 150 waits to activate the second washout mode until the controller 150 receives an indication that the chute 60 is in a discharge orientation and/or the concrete mixing truck 10 is stationary (e.g., based on the transmission thereof being in a neutral gear, a park gear, etc.). The second washout mode may include the wet down discharge mode. Following discharge, the controller 150 may immediately enter a third wash mode while at the job site or wait until the concrete mixing truck 10 reaches a designated washout area (e.g., based on a washout area geofence, GPS, etc.). The third washout mode may include the partial discharge wash mode, the complete discharge wash mode, and/or the continuous wash mode.

Figure 19:
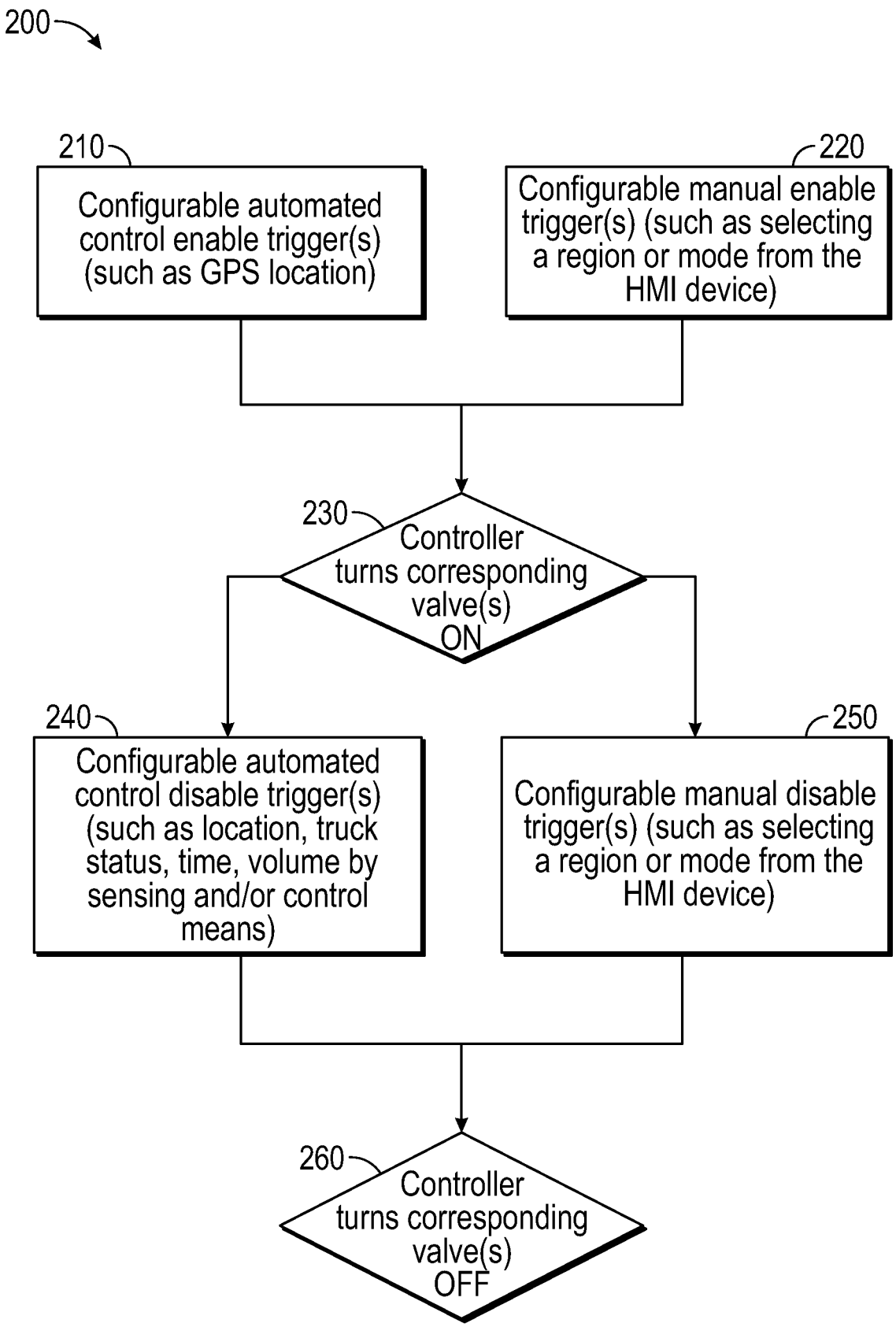
FIG. 19 is a flow diagram of a method for controlling electronically controllable valves, according to an exemplary embodiment.
Figure 20:
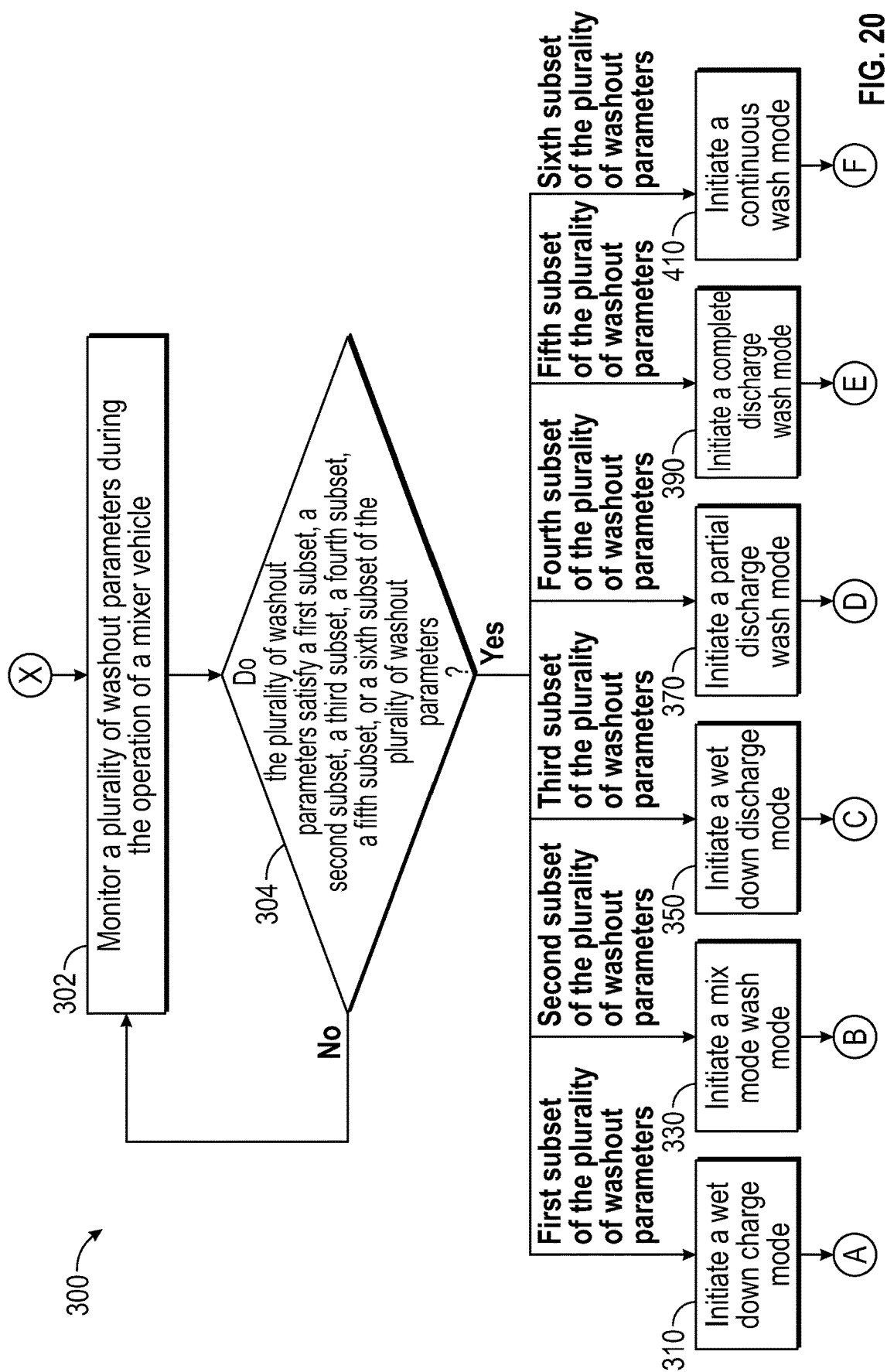
Figure 21:
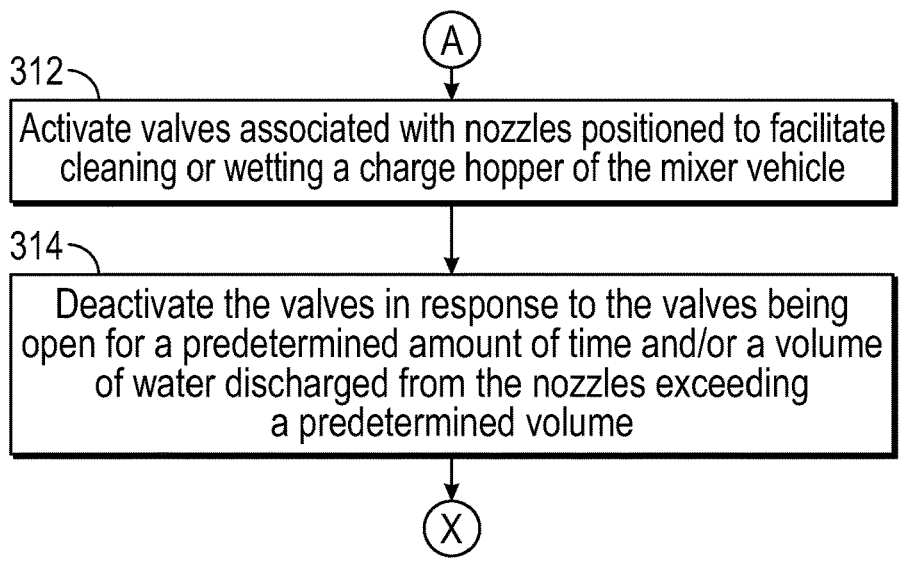
Figure 22:
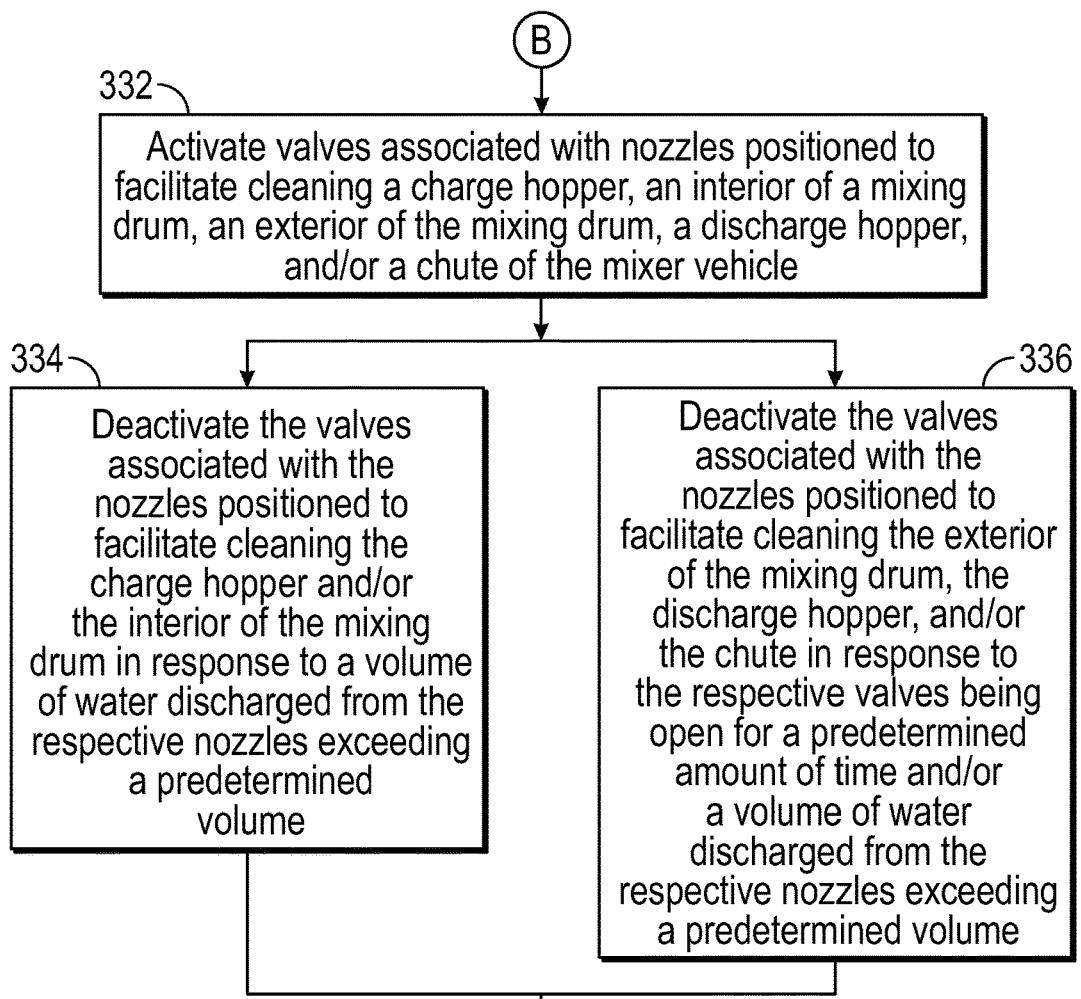
Figure 25:
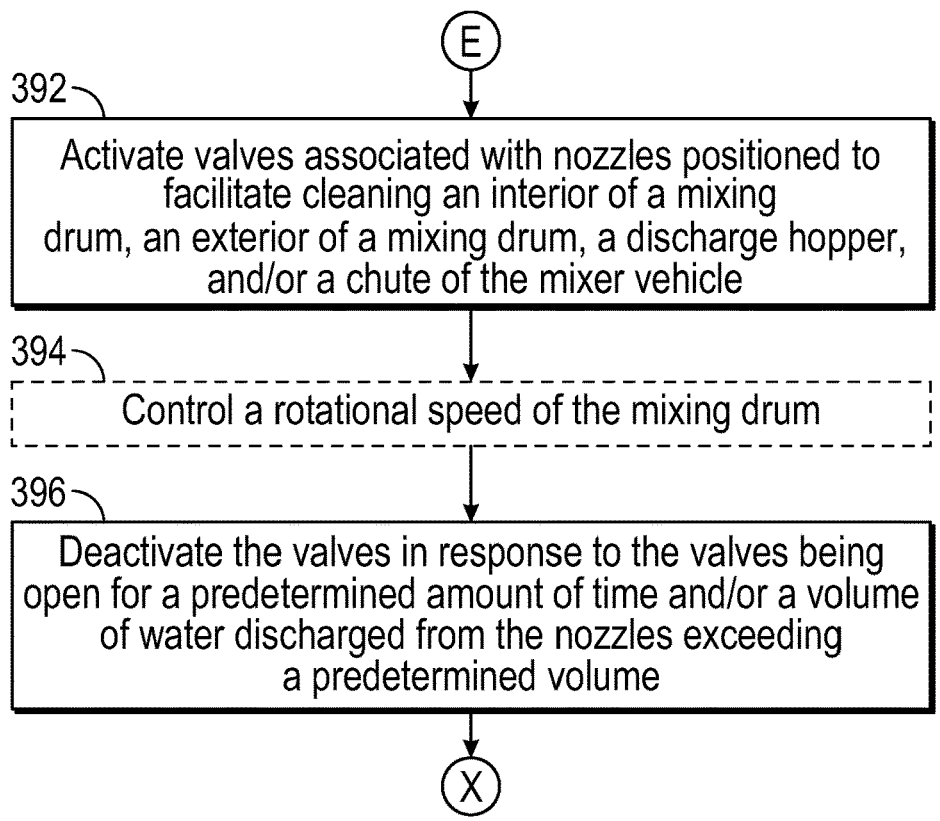
Figure 26:
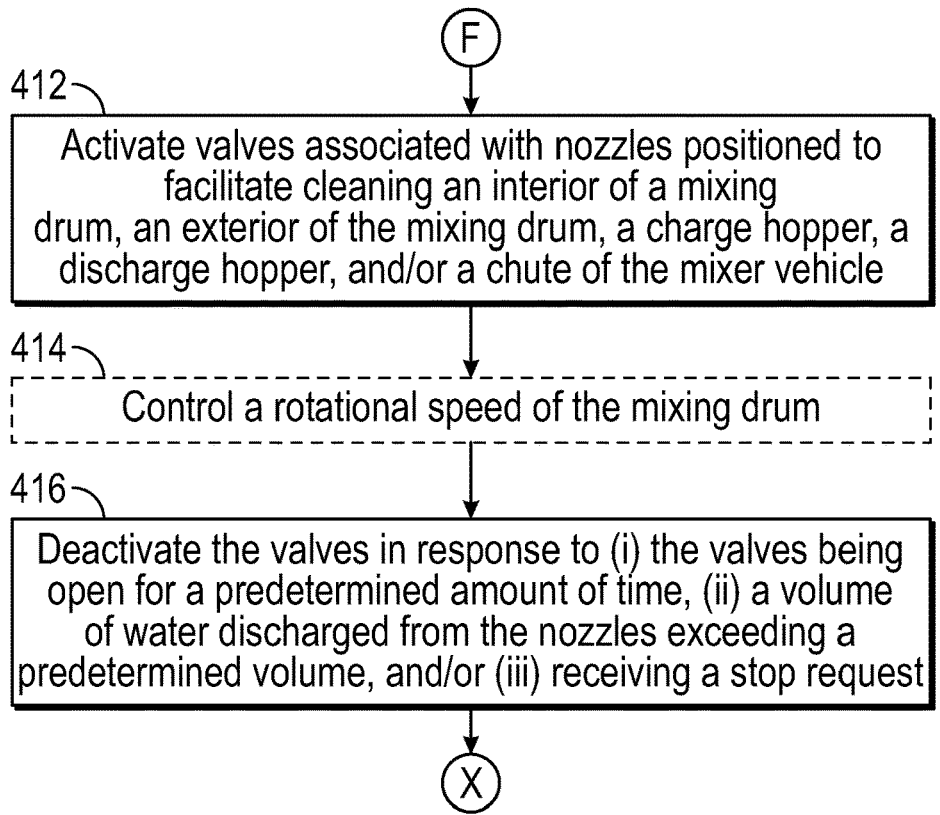

Referring now to FIG. 19, a method 200 for controlling the electronically controllable valves 130 is shown, according to an exemplary embodiment. At step 210, the controller 150 receives the instructions from the fleet manager based on the parameters (e.g., location, etc.) that the controller 150 provided to the fleet manager. For example, the instructions received from the fleet manager may specify that fluid is to be provided to the chute 60 every three hours. At step 220, the controller 150 receives commands from the user via the user interface 160. For example, the controller 150 may receive commands from the user interface 160 indicating that the user selected the "wash mode" previously described. At step 230, the controller 150 opens the electronically controllable valves 130 corresponding to the instructions from the fleet manager (step 210) and the instructions from the user (step 220). Steps 240 and 250 occur simultaneously. At step 240, the controller 150 continues to proceed with the fleet manager's instructions. At step 250, the controller 150 continues to proceed with the user's commands. If the instructions or commands include prescribe limits on fluid usage (e.g., by volume, time, etc.), the controller 150 will monitor fluid usage and will close the corresponding electronically controllable valves once the prescribed limit is reached. At step 260, the controller 150 closes at least one of the electronically controllable valve 130 in response to the prescribed limit being reached.

Referring now to FIGS. 20-26, a method 300 for controlling a washout system (e.g., the automatic washout system 100, etc.) according to various washout modes is shown, according an exemplary embodiment. At step 302, a control system (e.g., the controller 150, etc.) is configured to monitor a plurality of washout parameters during the operation of a mixer vehicle (e.g., the concrete mixing truck 10, etc.). The plurality of washout parameters may include a geofence, an amount of concrete discharged from a mixing drum (e.g., the mixing drum 20, etc.) of the mixer vehicle, the quality of the concrete within the mixing drum, environmental parameters, operator acknowledgement/confirmation, mixer system component sensor readings, current active functions and previously active functions, job type, information and/or commands received using telematics, and/or still other parameters.

At step 304, the control system is configured to determine whether the plurality of washout parameters satisfy one of a first subset, a second subset, a third subset, a fourth subset, a fifth subset, or a sixth subset of the plurality of washout parameters. If none of the first subset, the second subset, the third subset, the fourth subset, the fifth subset, and the sixth subset of the plurality of washout parameters are met, the control system is configured to return to step 302.

The control system is configured to proceed to step 310 in response to the plurality of washout parameters satisfying the first subset of the plurality of washout parameters. The first subset of washout parameters may include a geofence (e.g., the concrete mixing truck 10 is located at a batch plant site, etc.), an indication that the mixing drum is empty, an indication that the mixer vehicle is going to be charged with a concrete mixture, and/or an indication that the concrete mixture will be a wet mixture, not a dry mixture, among other possible washout parameters. At step 310, the control system is configured to initiate a wet down charge mode of a washout system (e.g., the automatic washout system 100, etc.). The wet down charge mode may include the control system performing steps 312 and 314.

At step 312, the control system is configured to activate (e.g., engage, open, etc.) valves (e.g., the electronically controllable valves 130, etc.) associated with nozzles (e.g., the nozzles 140, etc.) positioned to facilitate cleaning and/or wetting a charge hopper (e.g., the charge hopper 40, etc.) of the mixer vehicle. At step 314, the control system is configured to deactivate (e.g., disengage, close, etc.) the valves in response to the valves being open for a predetermined amount of time and/or a volume of water discharged from the nozzles exceeding a predetermined volume. Such a wet down charge mode may facilitate preparing the charge hopper to receive a wet concrete mixture such that the wet concrete mixture flows more easily therethrough into the mixing drum from the charge hopper. The control system may then be configured to return to step 302.

The control system is configured to proceed to step 330 in response to the plurality of washout parameters satisfying the second subset of the plurality of washout parameters. The second subset of washout parameters may include a geofence (e.g., the concrete mixing truck 10 is located at a batch plant site, etc.), an indication that the mixing drum was recently loaded, an indication that the mixer vehicle is in a neutral or park gear, and/or an indication that the mixing drum is currently operating in a mix mode, among other possible washout parameters. At step 330, the control system is configured to initiate a mix mode wash mode of the washout system. The mix mode wash mode may include the control system performing steps 332-336.

At step 332, the control system is configured to activate (e.g., engage, open, etc.) valves associated with nozzles positioned to facilitate cleaning the charge hopper, a portion of an interior of the mixing drum (e.g., the mixing element 30 proximate the opening of the mixing drum 20, etc.), an exterior of the mixing drum, a discharge hopper (e.g., a collector, the discharge hopper 50, etc.), and/or a chute (e.g., the chute 60, etc.) of the mixer vehicle. In some embodiments, only the valves associated with the nozzles positioned to facilitate cleaning the charge hopper, the interior of the mixing, and/or the exterior of the mixing drum are activated. At step 344, the control system is configured to deactivate (e.g., disengage, close, etc.) the valves associated with the nozzles positioned to facilitate cleaning the charge hopper and/or the interior of the mixing drum in response to a volume of water discharged from the respective nozzles exceeding a predetermined volume (e.g., to prevent the concrete-water ratio of the concrete mixture within the mixing drum 20 from being affected, etc.). At step 346, the control system is configured to deactivate the valves associated with the nozzles positioned to facilitate cleaning the discharge hopper, the chute, and/or the exterior of the mixing drum in response to the respective valves being open for a predetermined amount of time and/or a volume of water discharged from the respective nozzles exceeding a predetermined volume. The control system may then be configured to return to step 302.

The control system is configured to proceed to step 350 in response to the plurality of washout parameters satisfying the third subset of the plurality of washout parameters. The third subset of washout parameters may include a geofence (e.g., the concrete mixing truck 10 is located at a job site, etc.), an indication that the chute is in a discharge orientation (e.g., extended, unfolded, etc.), and/or an indication that the mixer vehicle is going to discharge at least a portion of the concrete mixture, among other possible washout parameters. At step 350, the control system is configured to initiate a wet down discharge mode of the washout system. The wet down discharge mode may include the control system performing steps 352 and 354.

At step 352, the control system is configured to activate (e.g., engage, open, etc.) valves associated with nozzles positioned to facilitate cleaning and/or wetting the discharge hopper and/or the chute of the mixer vehicle. At step 354, the control system is configured to deactivate the valves in response to the valves being open for a predetermined amount of time and/or a volume of water discharged from the nozzles exceeding a predetermined volume. Such a wet down discharge mode may facilitate preparing the discharge hopper and/or the chute to receive a wet concrete mixture discharged from the mixing drum such that the wet concrete mixture flows more easily therethrough/therealong to a desired application area (e.g., a sidewalk, a slab, a foundation, a curb, a driveway, etc.). The control system may then be configured to return to step 302.

The control system is configured to proceed to step 370 in response to the plurality of washout parameters satisfying the fourth subset of the plurality of washout parameters. The fourth subset of washout parameters may include a geofence (e.g., the concrete mixing truck 10 is located at, leaving, or left a job site; the concrete mixing truck 10 is at a designated washout area; etc.), an indication that the mixing drum discharged a portion of the concrete mixture less than a total amount of the concrete mixture within the mixing drum at the job site, and/or (iii) an indication that the mixer vehicle has one or more additional discharge stops to make, among other possible washout parameters. At step 370, the control system is configured to initiate a partial discharge wash mode of the washout system. The partial discharge wash mode may include the control system performing steps 372-378.

At step 372, the control system is configured to activate (e.g., engage, open, etc.) valves associated with nozzles positioned to facilitate cleaning the portion of the interior of the mixing drum, the exterior of the mixing drum, the discharge hopper, and/or the chute of the mixer vehicle. At step 374, the control system is configured to control a rotational speed of the mixing drum (e.g., to ensure proper cleaning of the interior and/or exterior of the mixing drum 20, etc.). In some embodiments, the control system does not perform step 374. At step 376, the control system is configured to deactivate (e.g., disengage, close, etc.) the valves associated with the nozzles positioned to facilitate cleaning the interior of the mixing drum in response to a volume of water discharged from the respective nozzles exceeding a predetermined volume (e.g., to prevent the concrete-water ratio of the remaining concrete mixture within the mixing drum 20 from being affected, etc.). At step 378, the control system is configured to deactivate the valves associated with the nozzles positioned to facilitate cleaning the discharge hopper, the chute, and/or the exterior of the mixing drum in response to the respective valves being open for a predetermined amount of time and/or a volume of water discharged from the respective nozzles exceeding a predetermined volume. The control system may then be configured to return to step 302.

The control system is configured to proceed to step 390 in response to the plurality of washout parameters satisfying the fifth subset of the plurality of washout parameters. The fifth subset of washout parameters may include a geofence (e.g., the concrete mixing truck 10 is located at, leaving, or left a job site; the concrete mixing truck 10 is on its way back to or is at a batch plant site; the concrete mixing truck 10 is on its way to or is at a designated washout area; etc.), an indication that the mixing drum discharged all of the concrete mixture therein, and/or an indication that the concrete mixing truck 10 has no more stops to make, among other possible washout parameters. At step 390, the control system is configured to initiate a complete discharge wash mode of the washout system. The complete discharge wash mode may include the control system performing steps 392-396.

At step 392, the control system is configured to activate (e.g., engage, open, etc.) valves associated with nozzles positioned to facilitate cleaning the interior of the mixing drum, the exterior of the mixing drum, the discharge hopper, and/or the chute of the mixer vehicle. At step 394, the control system is configured to control a rotational speed of the mixing drum (e.g., to ensure proper cleaning of the interior and/or exterior of the mixing drum 20, etc.). In some embodiments, the control system does not perform step 394. At step 396, the control system is configured to deactivate the valves in response to the valves being open for a predetermined amount of time and/or a volume of water discharged from the nozzles exceeding a predetermined volume. The control system may then be configured to return to step 302.

The control system is configured to proceed to step 410 in response to the plurality of washout parameters satisfying the sixth subset of the plurality of washout parameters. The sixth subset of washout parameters may include an indication that a fluid source or tank (e.g., the source 110, etc.) of the mixer vehicle is coupled to a continuous water source (e.g., a refilling hose, a refilling pipe, etc.), a geofence (e.g., the concrete mixing truck 10 is located at a designated washout area, etc.), an indication that the concrete mixing truck 10 is in a neutral or park gear, and/or an indication of a selected region or component of the mixer vehicle to wash with the washout system, among other possible washout parameters. At step 410, the control system is configured to initiate a continuous wash mode of the washout system. The continuous wash mode may include the control system performing steps 412-416.

At step 412, the control system is configured to activate (e.g., engage, open, etc.) valves associated with nozzles positioned to facilitate cleaning the interior of the mixing drum, the exterior of the mixing drum, the charge hopper, the discharge hopper, and/or the chute of the mixer vehicle. At step 414, the control system is configured to control a rotational speed of the mixing drum (e.g., to ensure proper cleaning of the interior and/or exterior of the mixing drum 20, etc.). In some embodiments, the control system does not perform step 414. At step 416, the control system is configured to deactivate the valves in response to (i) the valves being open for a predetermined amount of time, (ii) a volume of water discharged from the nozzles exceeding a predetermined volume, and/or (iii) receiving a stop request. The control system may then be configured to return to step 302.

The mixing drum 20 may include an injection port. The injection port may provide access into the interior of the mixing drum 20 to inject water and/or chemicals (e.g., air entrainers, water reducers, set retarders, set accelerators, superplasticizers, corrosion inhibitors, coloring, calcium chloride, minerals, and/or other concrete additives, etc.). The injection port may include a valve that facilitates injecting the water and/or the chemicals into the mixing drum 20, while preventing the mixture within the mixing drum 20 from exiting the mixing drum 20 through the injection port. In some embodiments, the mixing drum 20 includes multiple injection ports (e.g., two injection ports, three injection ports, etc.) configured to facilitate independently injecting different water and/or chemicals into the mixing drum 20.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary," as used herein to describe various embodiments, is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members, the two members and any additional intermediate members being integrally formed as a single unitary body with one another or with the two members, or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A concrete mixer vehicle comprising:
   a charge hopper configured to receive a mixture or mixture ingredients;
   a mixing drum positioned to receive the mixture or the mixture ingredients from the charge hopper;
   a discharge hopper positioned to selectively receive a wet mixture from the mixing drum;
   a chute positioned to receive the wet mixture from the discharge hopper;
   a tank configured to store a fluid; and
   an automatic washout system comprising:
      a plurality of electronically controllable valves that are in fluid communication with the tank, the plurality of electronically controllable valves operable between an open position and a closed position;
      a plurality of nozzles, one or more of the plurality of nozzles fluidly coupled to a respective one of the plurality of electronically controllable valves, each of the plurality of nozzles positioned to provide the fluid to a respective target when the respective one of the plurality of electronically controllable valves is selectively activated to the open position; and
      a controller having one or more memory devices coupled to one or more processors, the one or more memory devices configured to store instructions thereon that, when executed by the one or more processors, cause the one or more processors to:
         monitor a plurality of washout parameters during operation of the concrete mixer vehicle; and
         initiate one of a plurality of washout modes in response to a subset of the plurality of washout parameters being satisfied for the one of the plurality of washout modes;
         wherein initiating a first of the plurality of washout modes includes activating one or more of the plurality of electronically controllable valves such that nozzles associated with the one or more of the plurality of electronically controllable valves provide the fluid to clean at least two of the charge hopper, the interior of the mixing drum, the exterior of the mixing drum, the discharge hopper, and the chute, simultaneously;
         wherein initiating a second of the plurality of washout modes includes preventing one or more of the plurality of electronically controllable valves from being activated to prevent the fluid from being discharged onto the ground; and
         wherein the second of the plurality of washout modes includes a no mess mode that prevents washing the discharge hopper and the chute to prevent the fluid from being discharged onto the ground.

2. The concrete mixer vehicle of claim 1, wherein the first or the second of the plurality of washout modes includes a mix mode wash mode, wherein, in the mix mode wash mode, the one or more memory devices are further configured to store instructions thereon that, when executed by the one or more processors, cause the one or more processors to:
   activate respective electronically controllable valves associated with respective nozzles that are positioned to facilitate cleaning an interior surface of the charge hopper and a portion of the interior of the mixing drum; and
   deactivate the respective electronically controllable valves associated with the respective nozzles that are positioned to facilitate cleaning the interior surface of the charge hopper and the portion of the interior of the mixing drum in response to a volume of the fluid discharged from the respective nozzles reaching a predetermined volume.

3. The concrete mixer vehicle of claim 2, wherein the subset of the plurality of washout parameters for the mix mode wash mode includes at least one of (i) a batch plant geofence, (ii) an indication that the mixing drum was recently charged with the mixture or the mixture ingredients, (iii) an indication that the concrete mixer vehicle is in a neutral gear or a park gear, and (iv) an indication that the mixing drum is currently operating in an initial mix mode.

4. The concrete mixer vehicle of claim 1, wherein the first of the plurality of washout modes includes a wet down discharge mode, wherein, in the wet down discharge mode, the one or more memory devices are further configured to store instructions thereon that, when executed by the one or more processors, cause the one or more processors to:
   activate respective electronically controllable valves associated with respective nozzles that are positioned to facilitate wetting an interior surface of the discharge hopper and the chute; and
   deactivate the respective electronically controllable valves associated with the respective nozzles that are positioned to facilitate wetting the interior surface of the discharge hopper and the chute in response to at least one of (i) a volume of the fluid discharged from the respective nozzles reaching a predetermined volume and (ii) the respective electronically controllable valves being active for a predetermined period of time.

5. The concrete mixer vehicle of claim 4, wherein the subset of the plurality of washout parameters for the wet down discharge mode includes at least one of (i) a job site geofence, (ii) an indication that the chute is in a discharge orientation, and (iii) an indication that the mixing drum is going to discharge at least a portion of the wet mixture.

6. The concrete mixer vehicle of claim 1, wherein the first of the plurality of washout modes includes a partial discharge wash mode, wherein, in the partial discharge wash mode, the one or more memory devices are further configured to store instructions thereon that, when executed by the one or more processors, cause the one or more processors to:
   activate respective electronically controllable valves associated with respective nozzles that are positioned to facilitate cleaning the interior of the mixing drum, the exterior of the mixing drum, the discharge hopper, and the chute;

deactivate the respective electronically controllable valves associated with the respective nozzles that are positioned to facilitate cleaning the interior of the mixing drum in response to a volume of the fluid discharged into the interior of the mixing drum from the respective nozzles reaching a predetermined volume; and deactivate the respective electronically controllable valves associated with the respective nozzles that are positioned to facilitate cleaning the exterior of the mixing drum, the discharge hopper, and the chute in response to at least one of (i) a volume of the fluid discharged from the respective nozzles reaching a predetermined volume and (ii) the respective electronically controllable valves being active for a predetermined period of time.

7. The concrete mixer vehicle of claim 6, wherein the subset of the plurality of washout parameters for the partial discharge wash mode includes at least one of (i) a job site geofence, (ii) a designated washout area geofence, (iii) an indication that the mixing drum discharged a portion of the wet mixture at a job site that is less than a total amount of the wet mixture within the mixing drum, and (iv) an indication that the concrete mixer vehicle has one or more additional discharge stops to make.

8. The concrete mixer vehicle of claim 6, wherein the one or more memory devices are further configured to store instructions thereon that, when executed by the one or more processors, cause the one or more processors to control a rotational speed of the mixing drum during the partial discharge wash mode.

9. The concrete mixer vehicle of claim 1, wherein the first of the plurality of washout modes includes a complete discharge wash mode, wherein, in the complete discharge wash mode, the one or more memory devices are further configured to store instructions thereon that, when executed by the one or more processors, cause the one or more processors to:

activate respective electronically controllable valves associated with respective nozzles that are positioned to facilitate cleaning the interior of the mixing drum, the exterior of the mixing drum, the discharge hopper, and the chute; and deactivate the respective electronically controllable valves associated with the respective nozzles that are positioned to facilitate cleaning the interior of the mixing drum, the exterior of the mixing drum, the discharge hopper, and the chute in response to at least one of (i) a volume of the fluid discharged from the respective nozzles reaching a predetermined volume and (ii) the respective electronically controllable valves being active for a predetermined period of time.

10. The concrete mixer vehicle of claim 9, wherein the subset of the plurality of washout parameters for the complete discharge wash mode includes at least one of (i) a job site geofence, (ii) a batch plant geofence, (iii) a designated washout area geofence, (iv) an indication that the mixing drum discharged all of the wet mixture stored therein, and (v) an indication that the concrete mixer vehicle has no further discharge stops to make.

11. The concrete mixer vehicle of claim 1, wherein the first of the plurality of washout modes includes a continuous wash mode, wherein, in the continuous wash mode, the one or more memory devices are further configured to store instructions thereon that, when executed by the one or more processors, cause the one or more processors to:

activate respective electronically controllable valves associated with respective nozzles that are positioned to facilitate cleaning at least three of the charge hopper, the interior of the mixing drum, the exterior of the mixing drum, the discharge hopper, and the chute; and deactivate the respective electronically controllable valves associated with the respective nozzles that are positioned to facilitate cleaning the at least three of the charge hopper, the interior of the mixing drum, the exterior of the mixing drum, the discharge hopper, and the chute in response to at least one (i) a volume of the fluid discharged from the respective nozzles reaching a predetermined volume, (ii) the respective electronically controllable valves being active for a predetermined period of time, and (iii) receiving a stop request.

12. The concrete mixer vehicle of claim 11, wherein the subset of the plurality of washout parameters for the continuous wash mode includes (i) an indication that the tank is coupled to a continuous fluid source and (ii) at least one of (a) a designated washout area geofence, (b) an indication that the concrete mixer vehicle is in a neutral gear or a park gear, and (c) a selection of the at least three of the charge hopper, the interior of the mixing drum, the exterior of the mixing drum, the discharge hopper, and the chute to clean with the automatic washout system.

13. A concrete mixer vehicle comprising:
a charge hopper;
a mixing drum;
a discharge hopper;
a chute;
a tank configured to store a fluid; and
a washout system comprising:
  a plurality of electronically controllable valves that are in fluid communication with the tank;
  a plurality of nozzles, one or more of the plurality of nozzles fluidly coupled to a respective one of the plurality of electronically controllable valves; and
  a controller having one or more memory devices coupled to one or more processors, the one or more memory devices configured to store instructions thereon that, when executed by the one or more processors, cause the one or more processors to operate the washout system in a continuous wash mode in response to one or more continuous wash parameters being satisfied;
wherein the one or more continuous wash parameters include an indication that the tank is coupled to a continuous fluid source; and
wherein, in the continuous wash mode, the one or more memory devices are further configured to store instructions thereon that, when executed by the one or more processors, cause the one or more processors to:
  activate respective electronically controllable valves associated with respective nozzles that are positioned to facilitate cleaning at least one of the charge hopper, an interior of the mixing drum, an exterior of the mixing drum, the discharge hopper, or the chute; and
  deactivate the respective electronically controllable valves.

14. The concrete mixer vehicle of claim 13, wherein the one or more memory devices are further configured to store instructions thereon that, when executed by the one or more processors, cause the one or more processors to deactivate the respective electronically controllable valves in response to at least one of (i) a volume of the fluid discharged from the respective nozzles reaching a predetermined volume, (ii) the respective electronically controllable valves being active for a predetermined period of time, or (iii) receiving a stop request.

15. The concrete mixer vehicle of claim 13, wherein the one or more continuous wash parameters further include at least one of (i) a designated washout area geofence, (ii) an indication that the concrete mixer vehicle is in a neutral gear or a park gear, or (iii) a selection of the at least one of the charge hopper, the interior of the mixing drum, the exterior of the mixing drum, the discharge hopper, or the chute to clean with the washout system.

16. A concrete mixer vehicle comprising:
   a charge hopper;
   a mixing drum;
   a discharge hopper;
   a chute;
   a tank configured to store a fluid; and
   a washout system comprising:
      a plurality of electronically controllable valves that are in fluid communication with the tank;
      a plurality of nozzles, one or more of the plurality of nozzles fluidly coupled to a respective one of the plurality of electronically controllable valves; and
      a controller having one or more memory devices coupled to one or more processors, the one or more memory devices configured to store instructions thereon that, when executed by the one or more processors, cause the one or more processors to operate the washout system in a wetdown mode in response to receiving an indication that the mixing drum is about to be charged or discharged;
   wherein, in the wetdown mode, the one or more memory devices are further configured to store instructions thereon that, when executed by the one or more processors, cause the one or more processors to:
      activate respective electronically controllable valves associated with respective nozzles that are positioned to facilitate pre-wetting (i) the charge hopper or (ii) at least one of the discharge hopper or the chute prior to charging or discharging, respectively; and
      deactivate the respective electronically controllable valves.

17. The concrete mixer vehicle of claim 16, wherein the one or more memory devices are further configured to store instructions thereon that, when executed by the one or more processors, cause the one or more processors to deactivate the respective electronically controllable valves in response to at least one of (i) a volume of the fluid discharged from the respective nozzles reaching a predetermined volume or (ii) the respective electronically controllable valves being active for a predetermined period of time.

18. The concrete mixer vehicle of claim 16, wherein the indication is a charge indication that the mixing drum is about to be charged, and wherein the one or more memory devices are further configured to store instructions thereon that, when executed by the one or more processors, cause the one or more processors to activate the respective electronically controllable valves associated with the respective nozzles that are positioned to facilitate pre-wetting the charge hopper in response to receiving the charge indication.

19. The concrete mixer vehicle of claim 16, wherein the indication is a discharge indication that the mixing drum is about to be discharged, and wherein the one or more memory devices are further configured to store instructions thereon that, when executed by the one or more processors, cause the one or more processors to activate the respective electronically controllable valves associated with the respective nozzles that are positioned to facilitate pre-wetting the at least one of the discharge hopper or the chute in response to receiving the discharge indication.

* * * * *